US012647977B2

(12) United States Patent
Lee et al.

(10) Patent No.: US 12,647,977 B2
(45) Date of Patent: Jun. 2, 2026

(54) METHOD AND APPARATUS FOR CONFIGURING DEFAULT BEAM IN COMMUNICATION SYSTEM

(71) Applicant: Samsung Electronics Co., Ltd., Gyeonggi-do (KR)

(72) Inventors: Kyunggyu Lee, Gyeonggi-do (KR); Jinyoung Oh, Gyeonggi-do (KR); Youngrok Jang, Gyeonggi-do (KR); Hyoungju Ji, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 608 days.

(21) Appl. No.: 17/717,653

(22) Filed: Apr. 11, 2022

(65) Prior Publication Data

US 2022/0338224 A1 Oct. 20, 2022

(30) Foreign Application Priority Data

Apr. 9, 2021 (KR) ........................ 10-2021-0046619

(51) Int. Cl.
H04W 72/1273 (2023.01)
H04L 1/00 (2006.01)
(Continued)

(52) U.S. Cl.
CPC ....... H04W 72/1273 (2013.01); H04L 1/0068 (2013.01); H04W 72/0446 (2013.01); H04W 72/23 (2023.01)

(58) Field of Classification Search
CPC ................................................ H04W 72/1273
See application file for complete search history.

(56) References Cited

U.S. PATENT DOCUMENTS 11,044,619 B2 * 6/2021 Seo ...................... H04W 72/046
11,445,456 B2 * 9/2022 Lin ........................... H04L 5/10
(Continued)

FOREIGN PATENT DOCUMENTS

WO WO-2021095025 A1 * 5/2021 ......... H04B 7/06968
WO WO-2022021352 A1 * 2/2022 .......... H04W 72/542

OTHER PUBLICATIONS

Huawei, HiSilicon, "Discussion on the Beam Management Procedures for 52-71GHz Band", R1-2100203, 3GPP TSG RAN WG1 Meeting #104-e, Jan. 25-Feb. 5, 2021, 6 pages.
(Continued)

*Primary Examiner* — Abdeltif Ajid
(74) *Attorney, Agent, or Firm* — The Farrell Law Firm, P.C.

(57) ABSTRACT

The disclosure relates to a 5G or 6G communication system for supporting a higher data transmission rate. In a method performed by a UE in the communication system, the UE receives, from a base station, an RRC message including PDSCH resource allocation information and TCI information; receives, from the base station, DCI for scheduling at least one PDSCH through a first PDCCH; and receives, from the base station, data through the at least one PDSCH. In case that TCI information related to the at least one PDSCH is different from TCI information related to a second PDCCH overlapping the at least one PDSCH in a time domain and a beam switching time is required between the at least one PDSCH and the second PDCCH, the UE does not expect the second PDCCH to be searched in a region overlapping with the at least one PDSCH.

8 Claims, 21 Drawing Sheets

(51) Int. Cl.
    *H04W 72/0446*     (2023.01)
    *H04W 72/23*     (2023.01)

(56) References Cited

U.S. PATENT DOCUMENTS

| | | | |
|---|---|---|---|
| 12,063,682 B2 * | 8/2024 | Fan ..................... | H04L 5/0078 |
| 2019/0149365 A1 | 5/2019 | Chatterjee et al. | |
| 2020/0045709 A1 | 2/2020 | Sao et al. | |
| 2020/0221485 A1 * | 7/2020 | Cirik ................... | H04L 5/0048 |
| 2021/0211181 A1 * | 7/2021 | Yang .................... | H04W 76/19 |
| 2021/0219336 A1 * | 7/2021 | Fan .................... | H04W 74/006 |
| 2021/0321436 A1 * | 10/2021 | Nam ................. | H04W 72/0453 |
| 2021/0385826 A1 * | 12/2021 | Moon .................. | H04W 72/23 |
| 2022/0330216 A1 * | 10/2022 | He ........................ | H04W 72/23 |
| 2022/0361218 A1 * | 11/2022 | He ........................ | H04L 5/0053 |
| 2023/0337020 A1 * | 10/2023 | Da Silva ............... | H04B 7/088 |

OTHER PUBLICATIONS

OPPO, "Discussion on Beam Management", R1-2100152, 3GPP TSG RAN WG1 #104-e, Jan. 25-Feb. 5, 2021, 5 pages.

CATT, "Beam Management for New SCSs for up to 71GHz Operation", R1-2100373, 3GPP TSG RAN WG1 #104e, Jan. 25-Feb. 5, 2021, 7 pages.

International Search Report dated Jul. 13, 2022 issued in counterpart application No. PCT/KR2022/005193, 7 pages.

Moderator (Qualcomm), "Discussion Summary for mTRP PDCCH Reliability Enhancements", R1-2101838, 3GPP TSG-RAN WG1 Meeting #104-e, Jan. 25-Feb. 5, 2021, 49 pages.

Korean Office Action dated Jan. 29, 2026 issued in counterpart application No. 10-2021-0046619, 10 pages.

* cited by examiner

Figure 12:
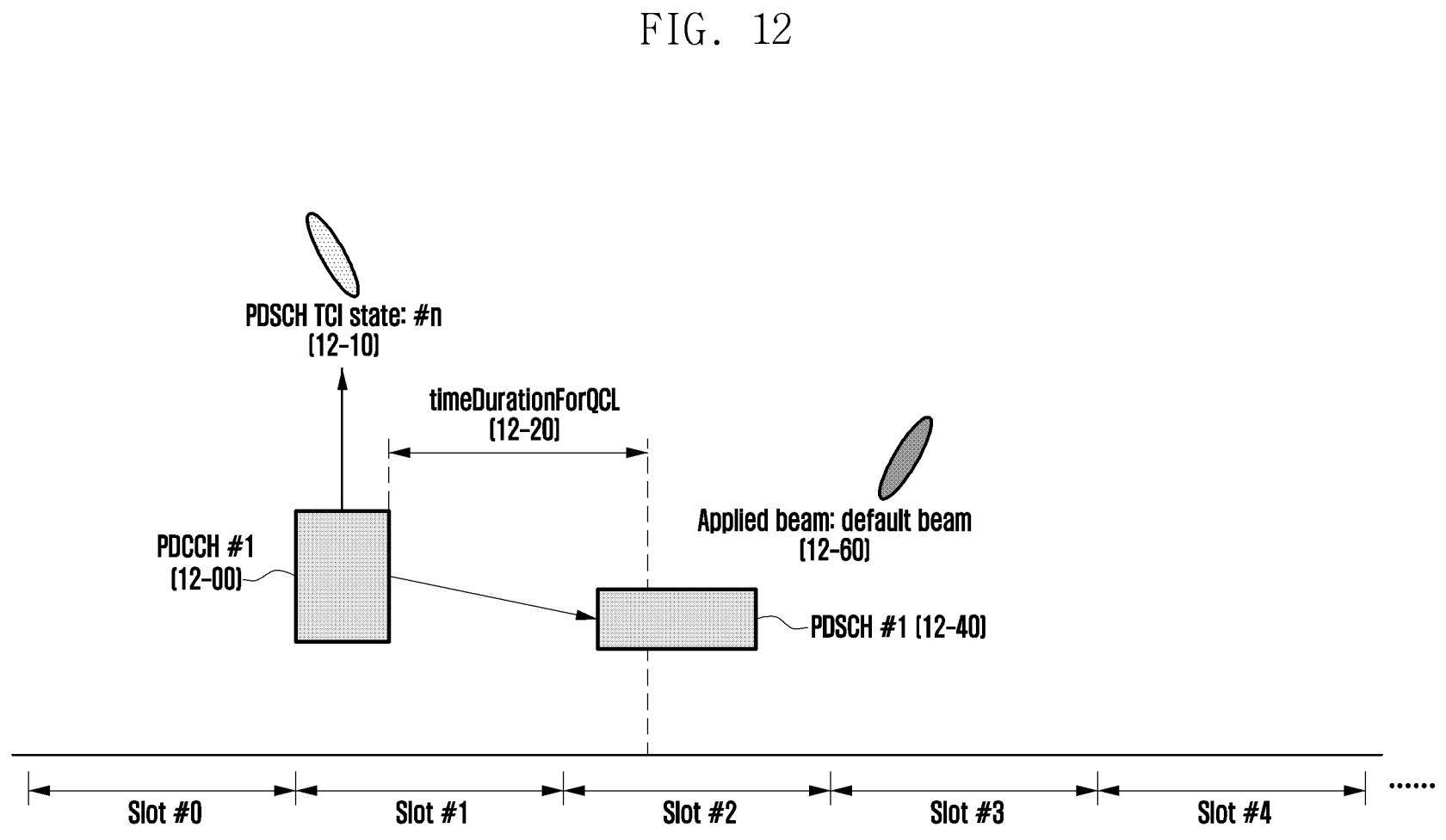

PDSCH TCI state: #n
[12-10]

timeDurationForQCL
[12-20]

Applied beam: default beam
[12-60]

PDSCH #1 [12-40]

PDCCH #1
[12-00]

Slot #0    Slot #1    Slot #2    Slot #3    Slot #4

METHOD AND APPARATUS FOR CONFIGURING DEFAULT BEAM IN COMMUNICATION SYSTEM

CROSS-REFERENCE TO RELATED APPLICATION(S)

This application is based on and claims priority under 35 U.S.C. § 119 to Korean Patent Application No. 10-2021-0046619, filed in the Korean Intellectual Property Office on Apr. 9, 2021, the entire disclosure of which is incorporated herein by reference.

BACKGROUND

1. Field

The disclosure relates generally to a communication system and, more particularly, to a method and an apparatus for configuring a default beam for data reception in a communication system.

2. Description of Related Art $5^{th}$ generation (5G) mobile communication technologies define broad frequency bands such that high transmission rates and new services are possible, and can be implemented in "sub 6 GHz" bands such as 3.5 GHz, and in "above 6 GHz" bands referred to as mmWave including 28 GHz and 39 GHz. In addition, it has been considered to implement $6^{th}$ generation (6G) mobile communication technologies (also referred to as "beyond 5G systems") in terahertz bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio (NR) user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (e.g., 2-step random access channel (RACH) for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, an increasing number of devices will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Furthermore, such development of 5G mobile communication systems will serve as a basis for developing new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), and full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

An aspect of the disclosure is to provide a method for determining a default beam when beam information for a UE to receive data is not indicated in a communication system.

Another aspect of the disclosure is to provide, in advance, a default value of a beam for a UE to receive data from a base station in a communication system, thereby reducing overhead for beam configuration.

In accordance with an aspect of the disclosure, a method is provided for a UE in a communication system. The method includes receiving, from a base station, a radio resource control (RRC) message including physical downlink (DL) shared channel (PDSCH) resource allocation information and transmission configuration indication (TCI) information; receiving, from the base station, DL control information (DCI) for scheduling at least one PDSCH through a first physical DL control channel (PDCCH); and receiving, from the base station, data through the at least one PDSCH. In case that TCI information related to the at least one PDSCH is different from TCI information related to a second PDCCH overlapping the at least one PDSCH in a time domain and a beam switching time is required between the at least one PDSCH and the second PDCCH, the UE does not search for the second PDCCH in a region overlapping with the at least one PDSCH.

In accordance with another aspect of the disclosure, a method is provided for a base station in a communication system. The method includes transmitting, to a UE, an RRC message including physical DL shared channel (PDSCH) resource allocation information and TCI information; transmitting DCI for scheduling at least one PDSCH to the UE through a first PDCCH; and transmitting, to the UE, data through the at least one PDSCH. In case that TCI information related to the at least one PDSCH is different from TCI information related to a second PDCCH overlapping the at least one PDSCH in a time domain and a beam switching time is required between the at least one PDSCH and the second PDCCH, DCI is not transmitted through the second PDCCH in a region overlapping with the at least one PDSCH.

In accordance with another aspect of the disclosure, a UE is provided for use in a communication system. The UE includes a transceiver; and a controller that is connected to the transceiver and configured to receive, from a base station, an RRC message including PDSCH resource allocation information and TCI information; receive, from the base station, DCI for scheduling at least one PDSCH through a first PDCCH; and receive, from the base station, data through the at least one PDSCH. In case that TCI information related to the at least one PDSCH is different from TCI information related to a second PDCCH overlapping the at least one PDSCH in a time domain and a beam switching time is required between the at least one PDSCH and the second PDCCH, the UE does not search for the second PDCCH in a region overlapping with the at least one PDSCH.

In accordance with another aspect of the disclosure, a base station is provided for use in a communication system. The base station includes a transceiver; and a controller that is connected to the transceiver and configured to transmit, to a UE, an RRC message including PDSCH resource allocation information and TCI information; transmit, to the UE, DCI for scheduling at least one PDSCH to the UE through a first PDCCH; and transmit data through the at least one PDSCH. In case that TCI information related to the at least one PDSCH is different from TCI information related to a second PDCCH overlapping the at least one PDSCH in a time domain and a beam switching time is required between the at least one PDSCH and the second PDCCH, DCI is not transmitted through the second PDCCH in a region overlapping with the at least one PDSCH.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a frame, a subframe, and a slot structure in a 5G according to an embodiment;

FIG. 11A illustrates a method in which a base station and a UE perform data transmission or reception by considering a DL data channel and a rate matching resource according to an embodiment;

FIG. 12 illustrates an operation of a PDSCH default beam according to an embodiment;

DETAILED DESCRIPTION

Figure 1:
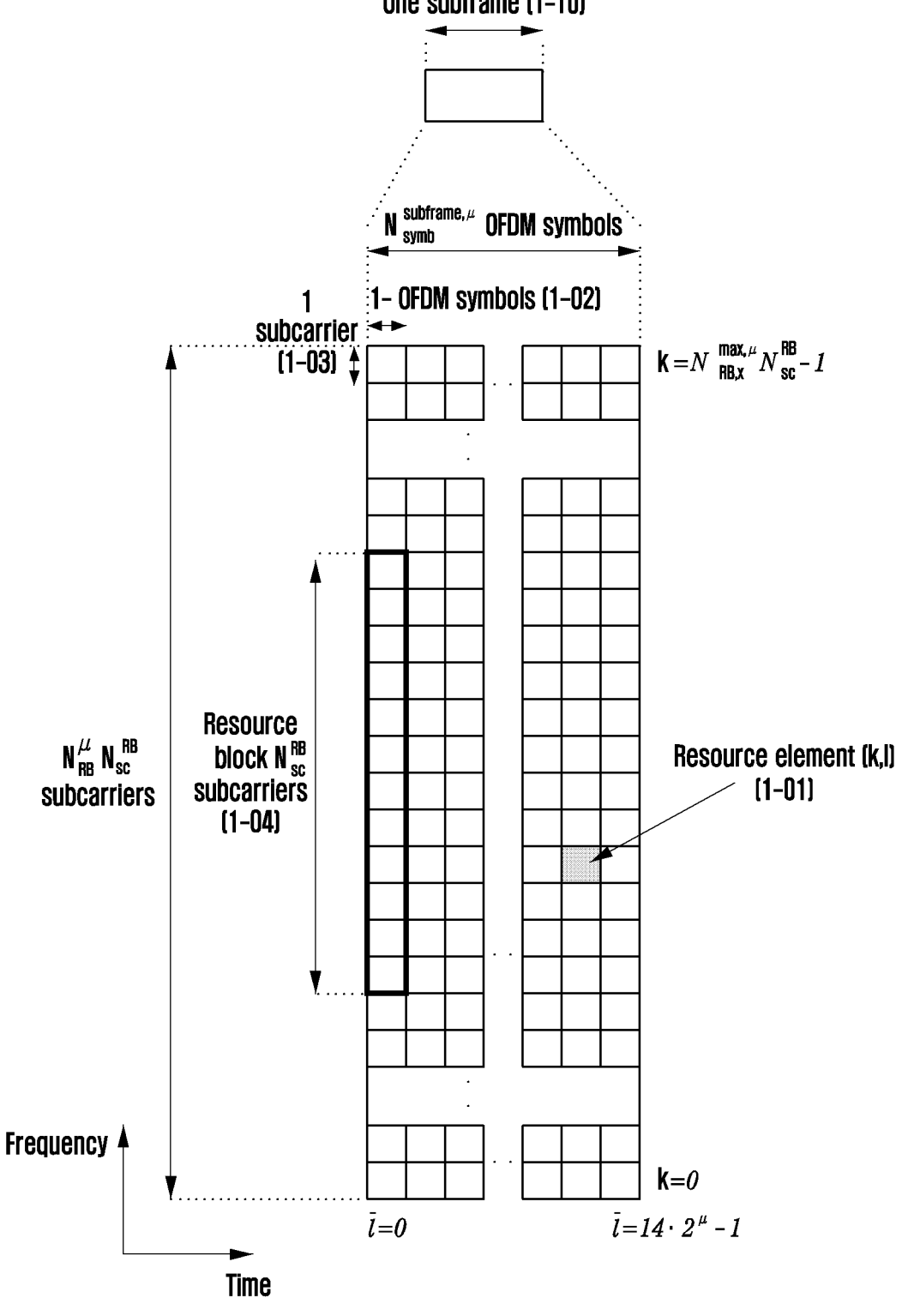
FIG. 1 illustrates a transmission structure of a time-frequency domain in long-term evolution (LTE) or evolved universal terrestrial radio access (E-UTRA), LTE-advanced (LTE-A), NR, or a wireless communication system similar thereto according to an embodiment.

Hereinafter, various embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure.

In the accompanying drawings, some elements may be exaggerated, omitted, or schematically illustrated. Further, the size of each element does not completely reflect the actual size. Additionally, identical or corresponding elements may be provided with identical or corresponding reference numerals.

Advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s).

In some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, a "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by a "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, a "unit" in the embodiments may include one or more processors.

Hereinafter, the operation principle of the disclosure will be described in detail with reference to the accompanying drawings.

The terms which will be described below are defined in consideration of the functions in the disclosure, and may be different according to users, intentions of the users, or customs. Therefore, the definitions of the terms should be made based on the contents throughout the specification.

In the following description, a base station may be an entity that allocates resources to terminals, such as a gNode B, an eNode B, a Node B, a wireless access unit, a base station controller, and a node on a network.

A terminal may include a UE, a mobile station (MS), a cellular phone, a smartphone, a computer, or a multimedia system capable of performing communication functions. Of course, examples of the base station and the terminal are not limited thereto.

The following description of the disclosure is directed to technology for receiving broadcast information from a base station by a terminal in a wireless communication system. The disclosure relates to a communication technique for converging Internet of things (IoT) technology with a 5G communication system designed to support a higher data transfer rate beyond a $4^{th}$ generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology In the following description, terms referring to broadcast information, terms related to communication coverage, terms referring to state changes (e.g., events), terms referring to network entities, terms referring to messages, terms referring to device elements, etc., are illustratively used for the sake of convenience. Therefore, the disclosure is not limited by the terms as used below, and other terms referring to subjects having equivalent technical meanings may be used.

In the following description, some of terms and names defined in the 3rd Generation Partnership Project (3GPP) LTE standards may be used for the convenience of description. However, the disclosure is not limited by these terms and names, and may be applied in the same way to systems that conform other standards.

Wireless communication systems have been developed from wireless communication systems providing voice centered services to broadband wireless communication systems providing high-speed, high-quality packet data services, such as communication standards of high speed packet access (HSPA), LTE or E-UTRA, LTE-A, and LTE-Pro of the 3GPP, high rate packet data (HRPD) and ultra-mobile broadband (UMB) of 3GPP2, 802.16e of Institute of Electrical and Electronics Engineers (IEEE), etc.

An LTE system, which is a representative example of a broadband wireless communication system, has adopted an orthogonal frequency division multiplexing (OFDM) scheme in a DL and has adopted a single carrier frequency division multiple access (SC-FDMA) scheme in an uplink (UL). The UL refers to a wireless link through which a terminal (e.g., a UE or an MS) transmits data or a control signal to a base station (or eNodeB), and the DL refers to a wireless link through which a base station transmits data or a control signal to a terminal. The multiple access scheme normally allocates and operates time-frequency resources for transmission of data or control information according to each user so as to prevent the time-frequency resources from overlapping with each other, i.e., to establish orthogonality, thereby distinguishing the data or the control information of each user.

As a future communication system after LTE, i.e., a 5G communication system, has to be able to freely reflect various requirements of a user and a service provider, and thus services satisfying various requirements need to be supported. The services considered for the 5G communication system include eMBB, mMTC, URLLC, etc.

eMBB is intended to provide a higher data transmission rate than a data transmission rate supported by the LTE, LTE-A, or LTE-Pro. For example, in the 5G communication system, eMBB should be able to provide a peak data rate of 20 Gbps in the DL and a peak data rate of 10 Gbps in the UL from the viewpoint of one base station. At the same time, the 5G communication system should provide the increased user perceived data rate of the terminal.

In order to satisfy such requirements, improvement of various transmitting/receiving technologies including a further improved MIMO transmission technology is needed.

In addition, the 5G communication system uses a bandwidth wider than 20 MHz in a frequency band of 3 to 6 GHz or more than 6 GHz, instead of a 2 GHz band used by the current LTE, thereby satisfying a data transmission rate required in the 5G communication system.

mMTC is intended to support application services such as IoT in a 5G communication system. mMTC is required for an access support of a large-scale terminal in a cell, coverage enhancement of a terminal, improved battery time, and cost reduction of a terminal in order to efficiently provide IoT.

IoT should be able to support a large number of terminals (e.g., 1,000,000 terminals/km$^2$) in a cell because it is attached to various sensors and devices to provide communication functions. In addition, because the terminals supporting mMTC are more likely to be positioned in shaded areas not covered by a cell, such as a basement of a building due to nature of services, the terminals may require a wider coverage than other services provided by the 5G communication system. The terminals supporting mMTC should be relatively inexpensive and require very long battery life-time because it is difficult to frequently replace batteries of these terminals.

URLLC is a cellular-based wireless communication service used for mission-critical purposes, and the URLLC may consider a service used in remote control for robots or machinery, industrial automation, unmanned aerial vehicles, remote health care, emergency alerts, etc. Accordingly, the URLLC should provide very low latency and very high reliability. For example, URLLC-supportive services should meet an air interface latency of less than 0.5 milliseconds and simultaneously include requirements of a packet error rate of 10$^{-5}$ or less. Accordingly, for URLLC-supportive services, a 5G system should provide a transmit time interval (TTI) shorter than those for other services while securing design requirements for allocating a broad resource in a frequency band. The aforementioned mMTC, URLLC, and eMBB are only examples of different service types, and the service types to which the disclosure is applied are not limited to the above-described examples.

The above-discussed services considered in the 5G communication system should be converged with each other and provided, based on a single framework. That is, for an effective resource management and control, it is desirable that such services are controlled and transmitted by being integrated into one system rather than being operated independently.

Although embodiments of the disclosure will be described below using an LTE, LTE-A, LTE Pro, or NR system as an example, the disclosure may be applied to other communication systems having similar technical backgrounds or channel types. In addition, embodiments of the disclosure may be applied to other communication systems through some modifications within a range which does not significantly depart from the scope of the disclosure, as determined by a person having skilled technical knowledge.

The disclosure relates to a method and apparatus for reporting channel state information (CSI) for increasing power saving efficiency of a terminal in a wireless communication system.

When a terminal operates in a power saving mode in the wireless communication system, a power saving effect can be further improved by optimizing the CSI reporting method accordingly.

FIG. 1 illustrates a time-frequency resource of a wireless communication system according to an embodiment.

Referring to FIG. 1, the horizontal axis represents a time domain, and the vertical axis represents a frequency domain. A basic unit of resources in the time-frequency domain may be a resource element (RE) 1-01. The RE 1-01 may be defined by 1 OFDM symbol 1-02 in time axis and 1 subcarrier 1-03 in frequency axis. In the frequency domain, $$N_{sc}^{RB}$$

(e.g., 12) consecutive REs may configure one resource block (RB) 1-04. A plurality of OFDM symbols may configure one subframe 1-10.

Figure 2:
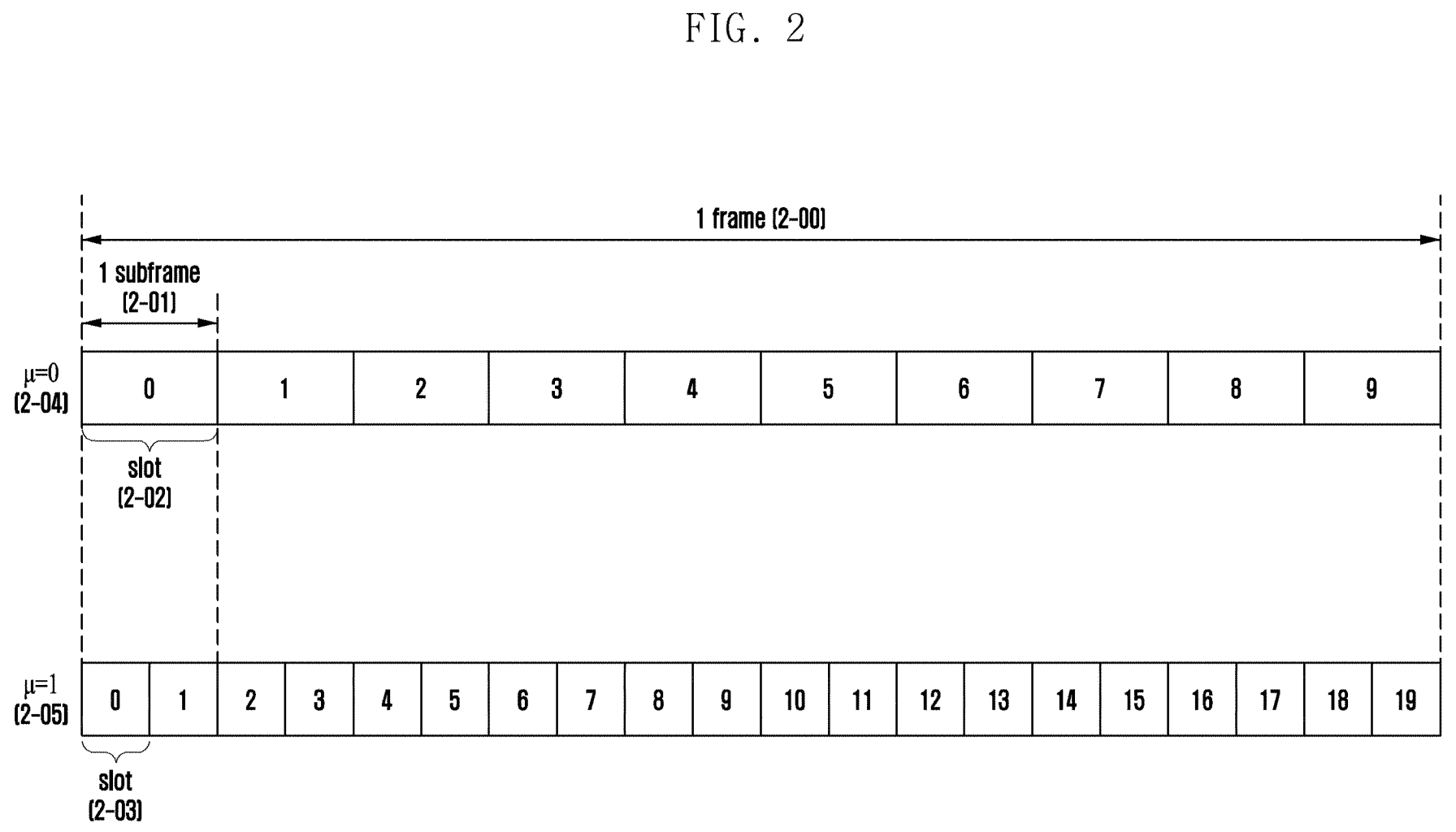

FIG. 2 illustrates a frame, a subframe, and a slot structure in a wireless communication system according to an embodiment.

Referring to FIG. 2, one frame 2-00 may be configured by one or more subframes 2-01, and one subframe may include one or more slots 2-02. For example, frame 2-00 may be defined as 10 ms. A subframe 2-01 may be defined as 1 ms, and here one frame 2-00 may be configured by a total of ten subframes 2-01. A slot 2-02 or 2-03 may be defined as 14 OFDM symbols (i.e., the number of symbols per slot $$\left(N_{symb}^{slot}\right) = 14)\right).$$

A subframe 2-01 may be configured by one or multiple slots 2-02 and 2-03, and the number of slots 2-02 and 2-03 per one subframe 2-01 may differ according to configuration value p 2-04 or 2-05 for a subcarrier spacing. In FIG. 2, the subcarrier spacing configuration value is p=0 (indicated by reference numeral 2-04) and p=1 (indicated by reference numeral 2-05) is illustrated. For p=0 (as indicated by reference numeral 2-04), the subframe 2-01 includes 1 slot 2-02, and for p=1 (as indicated by reference numeral 2-05), the subframe 2-01 includes two slots 2-03. That is, the number of slots per subframe $$\left(N_{slot}^{subframe,\mu}\right)$$

may differ according to a subcarrier spacing configuration value μ, and accordingly, the number of slots per frame $$\left(N_{slot}^{frame,\mu}\right)$$

may differ. According to each subcarrier spacing configuration $$\mu, N_{slot}^{subframe,\mu} \text{ and } N_{slot}^{frame,\mu}$$

may be defined in as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs or more. Therefore, when a UE receives the entire serving cell bandwidth, such as in the LTE system, power consumption of the UE may be extreme, and in order to solve this problem, it is possible for a base station to configure one or more BWPs for the UE so as to support the UE to change a reception area within a cell. In NR, the base station may configure an "initial BWP", which is a bandwidth of a CORESET #0 (or common search space (CSS)), for the UE via a master information block (MIB). Thereafter, the base station may configure an initial BWP (e.g., a first BWP) of the UE via RRC signaling, and may notify of at least one BWP configuration information that can be indicated through DCI in the future. Thereafter, the base station may notify of a BWP identifier (ID) via DCI so as to indicate which band the UE is to use. If the UE fails to receive DCI in a currently allocated BWP for a specific period of time or more, the UE returns to a "default BWP" and attempts to receive DCI.

Figure 3:
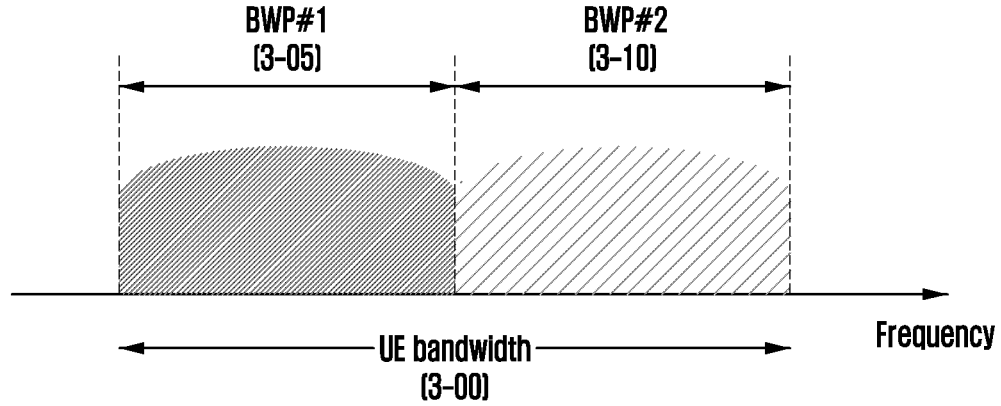
FIG. 3 illustrates a BWP configuration in a wireless communication system according to an embodiment.

FIG. 3 illustrates a BWP configuration in a wireless communication system according to an embodiment.

Referring to FIG. 3, FIG. 3 a UE bandwidth 3-00 is configured by BWP #1 3-05 and BWP #2 3-10. A base station may configure one or multiple BWPs for the UE, and may configure pieces of information as shown in Table 2 below for each BWP.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED {n0, n1, n2, n3, n4, n5}, |
| cyclicPrefix | ENUMERATED { extended } |
| } | |

The disclosure is not limited to the above example, and in addition to the configuration information, various parameters related to a BWP may be configured in the UE.

The above-described information may be transmitted by the base station, to the UE, via higher layer signaling, e.g., RRC signaling.

At least one BWP among the configured one or multiple BWPs may be activated. Whether to activate the configured BWP may be semi-statically transmitted from the base station, to the UE, via RRC signaling, or may be dynamically transmitted through a medium access control (MAC) control element (CE) or DCI.

A UE, before establishing an RRC connection, may be configured with an initial BWP for initial access, from a base station, through an MIB. More specifically, the UE may receive configuration information about a search apace and a CORESET through which the PDCCH can be transmitted, in order to receive system information required for initial access (which may correspond to remaining system information (RMSI) or system information block (SIB) 1) through the MIB in an initial access operation. Each of the CORESET and search space configured through the MIB may be regarded as ID 0.

The base station may notify the UE of configuration information, such as frequency allocation information, time allocation information, and numerology for the CORESET #0 through the MIB. In addition, the base station may notify the UE of configuration information regarding the monitoring periodicity and occasion for the CORESET #0, i.e., configuration information regarding the search space #0, through the MIB. The UE may regard the frequency domain configured as the CORESET #0, obtained from the MIB, as an initial BWP for initial access. Here, the ID of the initial BWP may be regarded as zero.

The configuration of the BWP supported by the above-described next-generation mobile communication system (e.g., a 5G or NR system) may be used for various purposes.

For example, in case that a bandwidth supported by the UE is smaller than a system bandwidth, the bandwidth supported by the UE may be supported through the BWP configuration. As shown in Table 2, a frequency location (configuration information 2) of the BWP is configured for the UE and thus the UE may transmit or receive data at a specific frequency location within the system bandwidth.

As another example, the base station may configure multiple BWPs in the UE for the purpose of supporting different numerologies. In order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed (FDMed), and when desiring to transmit or receive data at a specific subcarrier spacing, the BWP configured with the corresponding subcarrier spacing may be activated.

As another example, the base station may configure, in the UE, BWPs having bandwidths of different sizes for the purpose of reducing power consumption of the UE. When the UE supports a very large bandwidth, e.g., a bandwidth of 100 MHz, and transmits or receives data through the corresponding bandwidth, very large power consumption may occur. In particular, in a situation in which there is no traffic, it is very inefficient, in terms of power consumption, for the UE to monitor an unnecessary DL control channel for a large bandwidth of 100 MHz. Therefore, for the purpose of reducing power consumption of the UE, the base station may configure, for the UE, a BWP of a relatively small bandwidth, e.g., a BWP of 20 MHz. When there is no traffic, the UE may perform a monitoring operation in the BWP of 20

MHz. When data has been generated, the UE may transmit or receive the data by using the BWP of 100 MHz according to an indication of the base station.

In a method of configuring the BWP, the UEs, before establishing the RRC connection, may receive configuration information about the initial BWP through the MIB in the initial access operation. More specifically, the UE may be configured with a control region (or CORESET) for a DL control channel, through which DCI for scheduling an SIB may be transmitted, from a MIB of a physical broadcast channel (PBCH). The bandwidth of the CORESET configured through the MIB may be regarded as the initial BWP. The UE may receive a PDSCH, through which the SIB is transmitted, through the configured initial BWP. The initial BWP may be used for other system information (OST), paging, and random access in addition to the reception of the SIB.

Hereinafter, a synchronization signal (SS)/PBCH block (SSB) of a next generation mobile communication system will be described.

The SSB may refer to a physical layer channel block including a primary SS (PSS), a secondary SS (SSS), and a PBCH. More specifically, the SSB may be defined as follows:

PSS: a reference signal for DL time/frequency synchronization, which may provide some information of a cell ID.

SSS: a reference signal for DL time/frequency synchronization, which may provide the remaining cell ID information that is not provided by the PSS. In addition, the SSS may serve as a reference signal for demodulation of the PBCH.

PBCH: a channel that provides essential system information for transmission or reception of a data channel and a control channel of a UE. The essential system information may include search space-related control information indicating radio resource mapping information of a control channel, scheduling control information for a separate data channel for transmission of system information, etc.

SSB: the SSB may include a combination of a PSS, an SSS, and a PBCH. One or multiple SSBs may be transmitted within 5 ms, and each of the transmitted SSBs may be distinguished by indices.

The UE may detect the PSS and the SSS in the initial access operation, and may decode the PBCH. The UE may acquire the MIB from the PBCH, and may be configured with the CORESET #0 through the MIB. The UE may monitor the CORESET #0 under the assumption that the selected SSB and a demodulation reference signal (DMRS) transmitted in the CORESET #0 are quasi-co-located (QCLed). The UE may receive system information through DCI transmitted from the CORESET #0. The UE may acquire, from the received system information, RACH-related configuration information required for initial access. The UE may transmit a physical RACH (PRACH) to the base station by considering the selected SSB index, and the base station having received the PRACH may acquire information about an SSB index selected by the UE. The base station may know which block is selected, by the UE, among the SSBs, and may know that the UE has monitored the CORESET #0 corresponding to (or associated with) the selected SSB.

In a wireless communication system, one or more different antenna ports (or can be replaced by one or more channels, signals, and combinations thereof, but in the description of the disclosure in the future, for convenience, collectively referred to as "different antenna ports") may be associated with each other by the QCL configuration, e.g., as shown in Table 3 below.

TABLE 3

```
QCL-Info ::=              SEQUENCE {
   cell                   ServiceCellIndex
   bwp-Id                 BWP-Id
   referenceSignal CHOICE {
      csi-rs              NZP-CSI-RS-ResourceId,
      ssb                 SSB-Index
   },
   qcl-Type               ENUMERATED {typeA, typeB, typeC, typeD},
   ...
}
```

In the QCL configuration, two different antenna ports may be connected in a relationship between a (QCL) target antenna port and a (QCL) reference antenna port, and the UE may apply (or assume) all or part of statistical characteristics of a channel measured through the reference antenna port (e.g., large scale parameters of a channel, such as Doppler shift, Doppler spread, average delay, delay spread, average gain, and spatial reception (Rx) (or transmission (Tx)) parameters, and reception spatial filter coefficients or transmission spatial filter coefficients of the UE) upon reception through the target antenna port. In the example above, the target antenna port refers to an antenna port for transmitting a channel or signal, configured by a higher layer configuration including the QCL configuration, or an antenna port for transmitting a channel or signal to which a TCI state indicating the QCL configuration is applied. The reference antenna port refers to an antenna port for transmitting a channel or signal indicated (specified) by the referenceSignal parameter in the QCL configuration.

The statistical characteristics of a channel defined by the QCL configuration (indicated by a parameter qcl-Type in the QCL configuration) may be classified as follows according to the QCL type.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

Although four QCL types are provided above, the present disclosure is not limited to these types, e.g., fewer or more QCL types may be used.

QCL-TypeA is used when all statistical characteristics measurable in the frequency and time axes can be referenced since both the bandwidth and transmission interval of the target antenna port are sufficient compared to those of the reference antenna port (i.e., in case that the number of samples and the transmission band/time of the target antenna port on both the frequency axis and the time axis are greater than the number of samples and the transmission band/time of the reference antenna port).

QCL-TypeB is used when the bandwidth of the target antenna port is sufficient to measure statistical characteristics, which are measurable on the frequency axis, i.e., Doppler shift and Doppler spreads.

QCL-TypeC is used when only first-order statistics, i.e., Doppler shift and average delay can be referenced since the bandwidth and transmission interval of the target antenna port are insufficient to measure second-order statistics, i.e., Doppler spread and delay spreads.

QCL-TypeD is configured when spatial reception filter values used when receiving the reference antenna port can be used when receiving the target antenna port.

The base station can also configure or indicate up to two QCL configurations in one target antenna port through the following TCI state configuration as shown in Table 4.

TABLE 4

| TCI-State ::= | SEQUENCE { |
| --- | --- |
| tci-StateId | TCI-StateId, |
| qcl-Type1 | QCL-Info, |
| qcl-Type2 | QCL-Info   OPTIONAL, -- Need R |
| ... | |
| } | |

The first QCL configuration among two QCL configurations included in one TCI state configuration may be configured to be one of QCL-TypeA, QCL-TypeB, and QCL-TypeC. Here, the configurable QCL type is specified according to the types of the target antenna port and the reference antenna port, and will be described in detail below.

The second QCL configuration among two QCL configurations included in the one TCI state configuration may be configured to be QCL-TypeD, and may be omittable in some cases.

Tables 5 to 9 below provide valid TCI state configurations according to the types of target antenna port.

More specifically, Table 5 shows valid TCI state configurations when a target antenna port is for a CSI-reference signal (RS) for tracking (i.e., a tracking RS (TRS)). The TRS may be a non-zero power (NZP) CST-RS, in which a repetition parameter is not configured and trs-Info is configured to true, among CSI-RSs. The configuration No. 3 in Table 5 can be used for aperiodic TRS.

TABLE 5

| Valid TCI state Configu- ration | DL RS 1 | qcl-Type1 | DL RS 2 (if configured) | qcl-Type2 (if configured) |
| --- | --- | --- | --- | --- |
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 6 shows valid TOI state configurations when a target antenna port is for a CSI-RS for CSI. The CSI-RS for CSI refers to an NZP CSI-RS, in which a repetition parameter is not configured and trs-Info is also not configured to true, among CSI-RSs.

TABLE 6

| Valid TCI state Configu- ration | DL RS 1 | qcl-Type1 | DL RS 2 (if configured) | qcl-Type2 (if configured) |
| --- | --- | --- | --- | --- |
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 7 shows valid TCI state configurations when a target antenna port is for a CSI-RS for beam management (BM) (or CSI-RS for L1 reference signal received power (RSRP) reporting). The CSI-RS for BM refers to an NZP CSI-RS, in which a repetition parameter is configured and has a value of On or Off, and trs-Info is not configured to true, among CSI-RSs.

TABLE 7

| Valid TCI state Configu- ration | DL RS 1 | qcl-Type1 | DL RS 2 (if configured) | qcl-Type2 (if configured) |
| --- | --- | --- | --- | --- |
| 1 | TRS | QCL-TypeA | TRS(same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 8 shows valid TCI state configurations when a target antenna port is for a PDCCH DMRS.

TABLE 8

| Valid TCI state Configu- ration | DL RS 1 | qcl-Type1 | DL RS 2 (if configured) | qcl-Type2 (if configured) |
| --- | --- | --- | --- | --- |
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 9 shows valid TCI state configurations when a target antenna port is for a PDSCH DMRS.

TABLE 9

| Valid TCI state Configu- ration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a QCL configuration method according to Tables 5 to 9, the target antenna port and the reference antenna port for each operation are configured and operated as "SSB" →"TRS"→"CSI-RS for CSI, or CSI-RS for BM, or PDCCH DMRS, or PDSCH DMRS". Through this, it is possible to help the reception operation of the UE by associating the statistical characteristics that can be measured from the SSB and TRS with each antenna port.

Figure 4:
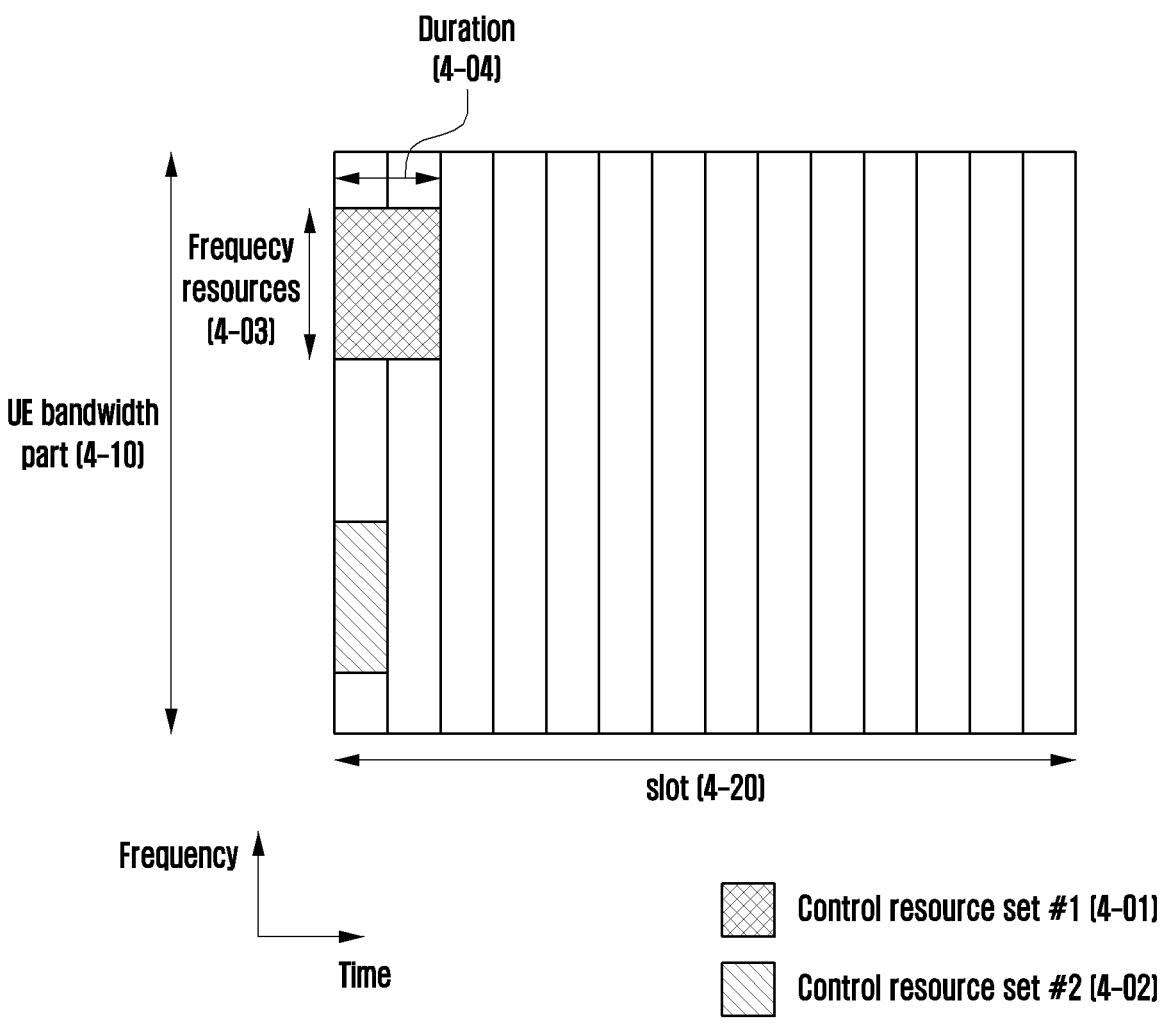
FIG. 4 illustrates a control resource set (CORESET) of a DL control channel in a wireless communication system according to an embodiment.

FIG. 4 illustrates a CORESET of a DL control channel in a wireless communication system according to an embodiment.

Figure 5A:
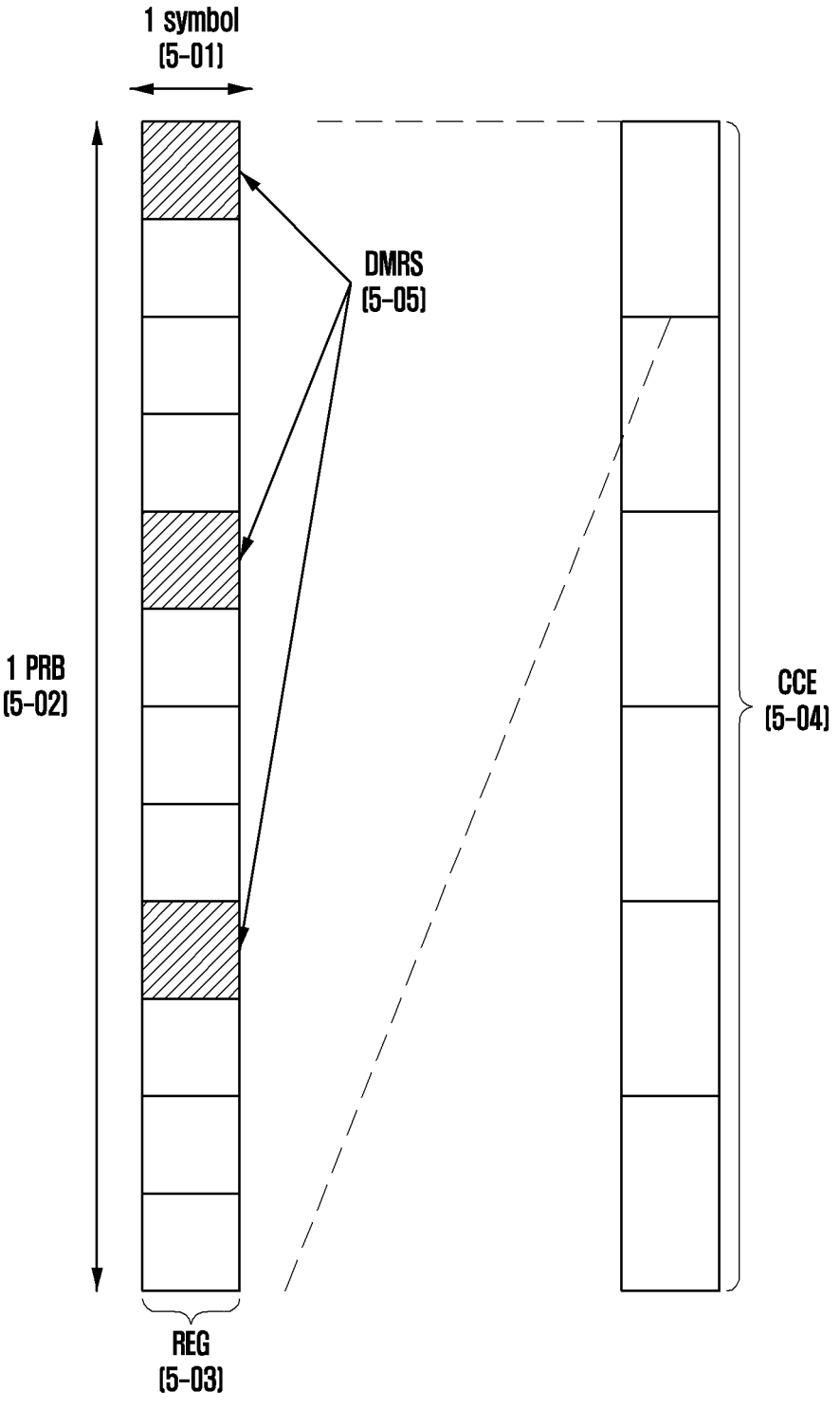
FIG. 5A illustrates a DL control channel in a wireless communication system according to an embodiment.

Referring to FIG. 4, a terminal bandwidth part 4-10 (e.g., a UE bandwidth part) is configured on the frequency axis, and two control resource sets (control resource set #1 4-01 and control resource set #2 4-02) are configured within one slot 4-20 on the time axis. The control resource sets 4-01 and 4-02 may be configured in a specific frequency resource 4-03 within the entire terminal bandwidth part 4-10 on the frequency axis. The control resource sets 4-01 and 4-02 may be configured by one or multiple OFDM symbols on the time axis, which may be defined as a control resource set duration 4-04. Referring to FIG. 4, control resource set #1 4-01 may be configured to be a control resource set length of 2 symbols, and control resource set #2 4-02 may be configured to be a control resource set length of 1 symbol. FIG. 5A illustrates a structure of a DL control channel in a wireless communication system according to an embodiment of the disclosure. That is, FIG. 5A illustrates an example of a basic unit of time and frequency resources configuring a DL control channel that can be used in a 5G system.

Referring to FIG. 5A, the basic unit of time and frequency resources configuring a control channel may be defined as an RE group (REG) 5-03. The REG 5-03 may be defined by 1 OFDM symbol 5-01 in time axis and one physical RB (PRB) 5-02, i.e., 12 subcarriers, in frequency axis. The base station may concatenate the REG 5-03 to configure a DL control channel allocation unit.

As shown in FIG. 5A, when a basic unit to which a DL control channel is allocated in 5G is referred to as a control channel element (CCE) 5-04, the CCE 5-04 may include multiple REGs 5-03. For example, when the REG 5-03 includes 12 REs and the CCE 5-04 includes 6 REGs 5-03, shown in FIG. 5A, the CCE 5-04 may include 72 REs. When the DL CORESET is configured, the corresponding region may include multiple CCEs 5-04. A specific DL control channel may be transmitted after being mapped to one or more CCEs 5-04 according to an aggregation level (AL) in the CORESET. The CCEs 5-04 in the CORESET are distinguished by numbers. Here, the numbers of the CCEs 5-04 may be assigned according to a logical mapping scheme.

The basic unit of the DL control channel shown in FIG. 5A, i.e., the REG 5-03, may include both REs to which DCI is mapped and a region to which a DMRS 5-05 which is a reference signal for decoding the DCI is mapped. In FIG. 5A, three DMRSs 5-05 are transmitted in 1 REG 5-03. The number of CCEs required for transmission of the PDCCH may be 1, 2, 4, 8, or 16 according to the AL. A different number of CCEs may be used to implement link adaptation of the DL control channel. For example, in case that AL=L, one DL control channel may be transmitted through L CCEs.

The UE should detect a signal in a state in which the UE does not know information about the DL control channel, and a search space indicating a set of CCEs may be defined for blind decoding. The search space may be a set of DL control channel candidates including CCEs that the UE has to attempt to decode at a given AL. Since there are various ALs that make one bundle of 1, 2, 4, 8, or 16 CCEs, the UE may have multiple search spaces. A search space set may be defined as a set of search spaces at all configured ALs.

The search space may be classified into a CSS and a UE-specific search space. A predetermined group of UEs or all of the UEs may examine the CSS of the PDCCH in order to receive cell common control information, such as dynamic scheduling of system information or a paging message.

For example, the UE may receive PDSCH scheduling allocation information for transmission of the SIB including cell operator information and the like by examining the CSS of the PDCCH. For the CSS, since a predetermined group of UEs or all of the UEs should receive the PDCCH, the CSS may be defined as a set of previously promised CCEs. However, the UE may receive scheduling allocation information about the UE-specific PDSCH or a physical UL shared channel (PUSCH) by examining the UE-specific search space of the PDCCH. The UE-specific search space may be UE-specifically defined as a function of the UE identity and various system parameters.

In 5G, the parameter for the search space of the PDCCH may be configured for the UE by from base station via higher layer signaling (e.g., SIB, MIB, and RRC signaling). The base station may configure, in the UE, the number of PDCCH candidates at each AL, the monitoring periodicity for the search space, monitoring occasion of symbol units in the slots for the search space, the search space type (CSS or UE-specific search space), a combination of a radio network temporary identifier (RNTI) and a DCI format to be monitored in the search space, a CORESET index to monitor the search space, etc. For example, the configuration information described above may include the information of Table 10 below.

TABLE 10

| | |
|---|---|
| SearchSpace ::= | SEQUENCE { |
| -- Identity of the search space. | SearchSpaceId = 0 identifies the |
| SearchSpace configured via PBCH (MIB) or ServingCellConfigCommon. | |
| searchSpaceId | SearchSpaceId, |
| controlResourceSetId | ControlResourceSetId, |
| monitoringSlotPeriodicityAndOffset | CHOICE { |
| sl1 | NULL, |
| sl2 | INTEGER (0..1), |
| sl4 | INTEGER (0..3), |
| sl5 | INTEGER (0..4), |
| sl8 | INTEGER (0..7), |
| sl10 | INTEGER (0..9), |
| sl16 | INTEGER (0..15), |
| sl20 | INTEGER (0..19) |
| } | |
| duration | INTEGER (2..2559) |
| monitoringSymbolsWithinSlot | BIT STRING (SIZE (14)) |
| nrofCandidates | SEQUENCE { |
| aggregationLevel1 | ENUMERATED {n0, n1, n2, n3, n4, n5, n6, n8}, |
| aggregationLevel2 | ENUMERATED {n0, n1, n2, n3, n4, n5, n6, n8}, |
| aggregation Level4 | ENUMERATED {n0, n1, n2, n3, n4, n5, n6, n8}, |
| aggregationLevel8 | ENUMERATED {n0, n1, n2, n3, n4, n5, n6, n8}, |
| aggregationLevel16 | ENUMERATED {n0, n1, n2, n3, n4, n5, n6, n8} |
| }, | |
| searchSpaceType | CHOICE { |
| -- Configures this search space as common search space (CSS) and DCI | |
| formats to monitor. | |

TABLE 10-continued

```
common                              SEQUENCE {
}
ue-Specific                         SEQUENCE {
-- Indicates whether the UE monitors in this USS for DCI formats 0-0 and 1-0 or
for formats 0-1 and 1-1.
   formats                          ENUMERATED {formats0-0-And-1-0,
formats0-1-And-1-1},
   ...
}
```

The base station may configure one or more search space sets for the UE based on configuration information. The base station may configure search space set 1 and search space set 2 in the UE. The base station may configure search space set 1 and search space set 2 in the UE. DCI format A scrambled by X-RNTI in the search space set 1 may be configured to be monitored in the CSS and DCI format B scrambled by Y-RNTI in the search space set 2 may be configured to be monitored in a UE-specific search space.

According to the configuration information, one or multiple search space sets may exist in the CSS or the UE-specific search space. For example, search space set #1 and search space set #2 may be configured as the CSS, and search space set #3 and search space set #4 may be configured as the UE-specific search space.

The CSS may be classified into a search space set of a specific type according to a purpose. An RNTI to be monitored may be different according to the determined type of search space set. For example, the CSS type, purpose, and RNTI to be monitored may be classified as Table 10A below.

TABLE 10A

| Search space type | Purpose | RNTI |
|---|---|---|
| Type0 CSS | PDCCH transmission for SIB schedule | SI-RNTI |
| Type0A CSS | PDCCH transmission for SI schedule (SIB2 etc.) other than SIB1 | SI-RNTI |
| Type1 CSS | PDCCH transmission for random access response (RAR) schedule, Msg3 retransmission schedule, and Msg4 schedule | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI, TPC-SRS-RNTI |
| | For PCell, PDCCH transmission for data schedule | C-RNTI, MCS-C-RNTI, CS-RNTI |

In the CSS, the following combinations of the DCI format and the RNTI may be monitored. However, the disclosure is not limited thereto.

DCI format 0_0/1_0 with cyclic redundancy check (CRC) scrambled by cell (C)-RNTI), configured scheduling (CS)-RNTI, semi-persistent (SP)-CSI-RNTI, random access (RA)-RNTI, temporary cell (TC)-RNTI, paging (P)-RNTI, system information (SI)-RNTI DC format 2_0 with CRC scrambled by slot format indicator (SFI)-RNTI DCI format 2_1 with CRC scrambled by interruption (INT)-RNTI DCI format 2_2 with CRC scrambled by transmit power control (TPC)-PUSCH-RNTI, TPC-PUCCH-RNTI DCI format 2_3 with CRC scrambled by TPC-sounding reference signal (SRS)-RNTI In the UE-specific search space, the following combinations of the DCI format and the RNTI may be monitored. However, the disclosure is not limited thereto.

DCI format 0_0/1_0 with CRC scrambled by C-RNTI, CS-RNTI, TC-RNTI

DC format 1_0/1_1 with CRC scrambled by C-RNTI, CS-RNTI, TC-RNTI

The specified RNTIs may follow the definitions and usages described below.

C-RNTI: For UE-specific PDSCH scheduling

TC-RNTI: For UE-specific PDSCH scheduling

CS-RNTI: For semi-statically configured UE-specific PDSCH scheduling

RA-RNTI: For PDSCH scheduling in random access operation

P-RNTI: For scheduling of PDSCH through which paging is transmitted

SI-RNTI: For PDSCH scheduling in which system information is transmitted

INT-RNTI: For notifying of whether to puncture PDSCH

TPC-PUSCH-RNTI: For indication of power control command for PUSCH

TPC-PUCCH-RNTI: For indication of power control command for PUCCH

TPC-SRS-RNTI: For indication of power control command for SRS

The above-described DCI formats may be defined as shown in Table 11 below.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, multiple search space sets may be configured with different parameters (e.g., the parameters in Table 10). Accordingly, the set of search space sets monitored by the UE may differ at each time point. When search space set #1 is configured with a X-slot period, search space set #2 is configured with a Y-slot period, and X and Y are different, the UE may monitor both search space set #1 and space set #2 in a specific slot, and may monitor one of search space set #1 and search space set #2 in a specific slot.

When a plurality of search space sets are configured for the UE, the following conditions may be considered in order to determine a search space set to be monitored by the UE.

[Condition 1: Limit the Maximum Number of PDCCH Candidates]

The number of PDCCH candidates that can be monitored per slot may not exceed $M^\mu$. The $M^\mu$ may be defined as the maximum number of PDCCH candidates per slot in a cell configured to a subcarrier spacing of $15 \cdot 2^\mu$ kHz, and may be defined as shown in Table 12 below.

TABLE 12

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limit the Maximum Number of CCEs]

The number of CCEs configuring the entire search space per slot (here, the entire search space may denote the entire set of CCEs corresponding to a union region of multiple search space sets) may not exceed $C^\mu$. The $C^\mu$ may be defined as the maximum number of CCEs per slot in a cell configured to a subcarrier spacing of $15 \cdot 2^\mu$ kHz, and may be defined as shown in Table 13 below.

TABLE 13

| μ | Maximum number of CCEs per slot and per serving cell ($C^\mu$) |
|---|---|
| 0 | 56 |
| 1 | 56 |
| 2 | 48 |
| 3 | 32 |

For the convenience of description, a situation in which both conditions 1 and 2 are satisfied at a specific time point is defined as "condition A". Therefore, not satisfying condition A may refer to not satisfying at least one of the above Conditions 1 and 2.

According to the configuration of the search space sets of the base station, a case in which condition A is not satisfied at a specific time point may occur. If condition A is not satisfied at a specific time point, the UE may select and monitor only some of the search space sets configured to satisfy condition A at a corresponding time point, and the base station may transmit PDCCH to the selected search space sets.

According to an embodiment of the disclosure selecting some search spaces from the entire configured search space set may conform to the following method.

[Method 1]

If condition A for a PDCCH is not satisfied at a specific time point (slot), the UE (or base station) may prioritize the selection of a search space set, in which a search space type is configured as a CSS, from among search space sets existing at a corresponding time point, than a search space set in which a search space type is configured as a UE-specific search space.

If all search space sets configured as CSSs are selected (i.e., if condition A is satisfied even after all search spaces configured as CSSs are selected), the UE (or base station) may select the search space sets configured as UE-specific search spaces. Here, if there are multiple search space sets configured as the UE-specific search spaces, a search space set having a low search space set index may have a higher priority. In consideration of the priority, the UE or base station may select the UE-specific search space sets within a range in which condition A is satisfied.

A UE may perform, for each subcarrier spacing, UE capability reporting for a case of having multiple PDCCH monitoring positions in a slot, and in this case, the term "span" may be used. A "span" denotes consecutive symbols in which the UE can monitor a PDCCH in a slot, and each PDCCH monitoring position is within one span. Span may be expressed as (X,Y), where x denotes the minimum number of symbols that need to be separated between the first symbols of two consecutive spans, and Y denotes the number of consecutive symbols in which the UE can monitor the PDCCH within one span. Here, the UE may monitor the PDCCH in an interval from the first symbol to the Y symbol of the span.

Figure 5B:
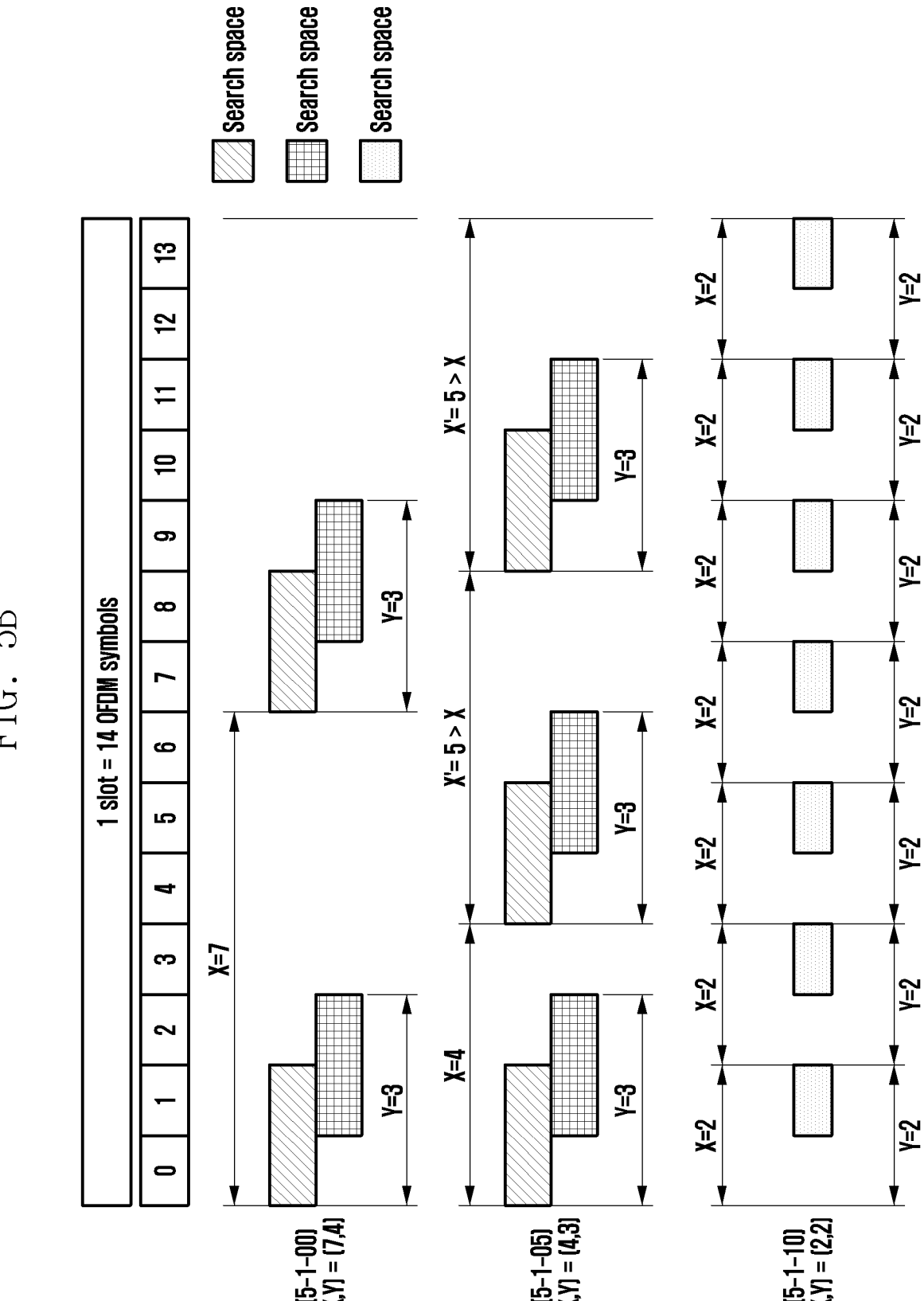
FIG. 5B illustrates a UE having a plurality of PDCCH monitoring occasions within a slot based on a span in a wireless communication system according to an embodiment.

FIG. 5B illustrates an example of a UE having a plurality of PDCCH monitoring occasions within a slot based on a span in a wireless communication system according to an embodiment.

Referring to FIG. 5B, a span may be expressed as (X,Y)= (7,4) (5-1-00), (4,3) (5-1-05), and (2,2) (5-1-10), and as an example, two spans that can be expressed by (7,4) (5-1-00) may exist in a slot. Here, the interval between the first symbols of two spans is expressed as X=7, PDCCH monitoring positions may exist within a total of Y symbols (Y=3) from the first symbol of each span, and search spaces 1 and 2 may exist within Y symbols (Y=3). As another example, a total of three spans that can be expressed as (4,3) (5-1-05) may exist in a slot, and the interval between the second and third spans may be separated by X' symbols (X'=5) greater than X=4.

Methods of allocating time and frequency resources for data transmission in NR are described below.

In NR, the following detailed frequency domain resource allocation (FD-RA) methods may be provided, in addition to FD resource candidate allocation through BWP indication.

Figure 6:
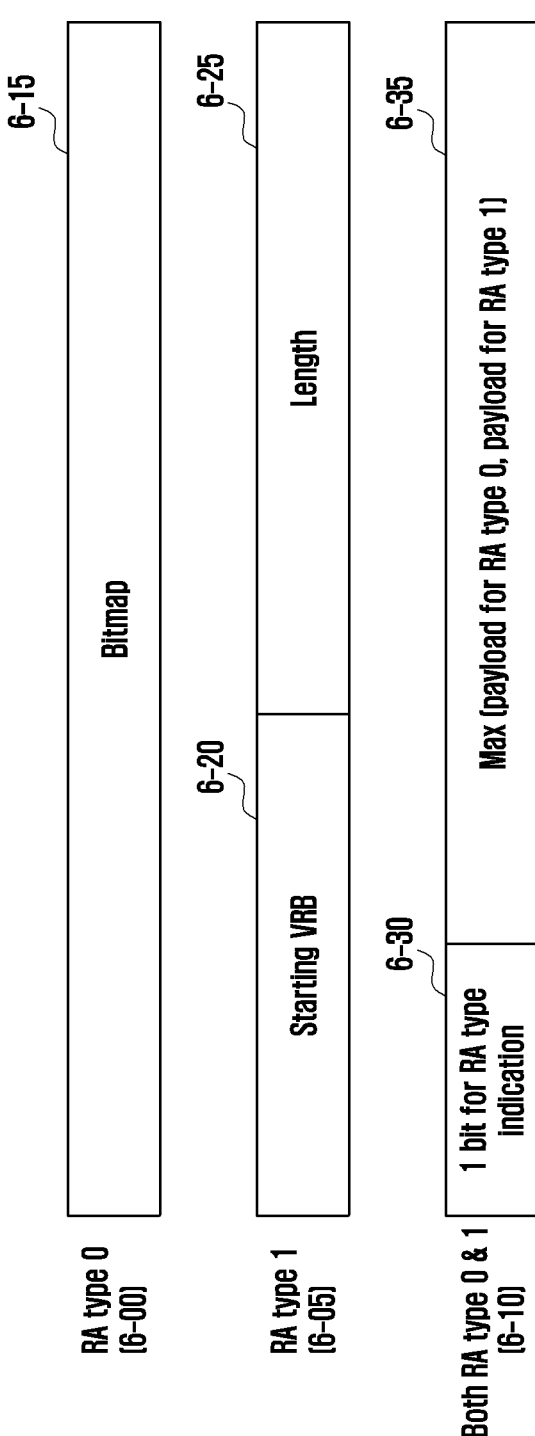
FIG. 6 illustrates a frequency-domain resource allocation of a PDSCH in a wireless communication system according to an embodiment.

FIG. 6 illustrates frequency-domain resource allocation of a PDSCH in a wireless communication system according to an embodiment. More specifically, FIG. 6 illustrates three frequency-domain resource allocation methods of type 0 (6-00), type 1 (6-05), and dynamic switch (6-10) configurable through a higher layer in NR.

Referring to FIG. 6, in case that a UE is configured to use only resource type 0 via higher layer signaling (6-00), DCI for allocation of a PDSCH to the corresponding UE includes a bitmap configured by a number of RB groups (RBGs) (NRBG) bits. More specifically, NRBG denotes the number of RBGs determined as shown in Table 14 below according to a BWP size allocated by a BWP indicator and a higher layer parameter rbg-Size, and data is transmitted to RBG indicated as "1" by the bitmap.

TABLE 14

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If a UE is configured to use only resource type 1 via higher layer signaling (6-05), some DCI for allocation of the PDSCH to the UE includes frequency-domain resource allocation information configured by $$\lceil \log_2(N_{RB}^{DL,BWP}(N_{RB}^{DL,BWP} + 1)/2) \rceil$$

bits. Through this information, the base station may configure a starting virtual resource block (VRB) 6-20 and the length of frequency-domain resources 6-25 continuously allocated therefrom.

When a UE is configured to use both resource type 0 and resource type 1 via higher layer signaling (6-10), DCI for allocation of PDSCH to the UE includes frequency-domain resource allocation information configured by bits of a greater value 6-35 among a payload 6-15 for configuration of resource type 0 and payloads 6-20 and 6-25 for configuration of resource type 1. Here, one bit may be added to the most significant bit (MSB) of the frequency-domain resource allocation information in the DCI, when the corresponding bit has a value of 0, it may indicate that resource type 0 is used, and when the corresponding bit has a value of 1, it may indicate that resource type 1 is used.

A base station may configure, for a UE, a table for time-domain resource allocation information for a DL data channel (e.g., a PDSCH) and a UL data channel (e.g., a PUSCH) via higher layer signaling (e.g., RRC signaling). With regard to a PDSCH, a table including maxNrofDL-Allocations=16 entries may be configured, and with regard to a PUSCH, a table including maxNrofUL-Allocations=16 entries may be configured. The time-domain resource allocation information may include PDCCH-to-PDSCH slot timing (corresponding to a time gap in slot units between a time point of receiving a PDCCH and a time point of transmitting a PDSCH scheduled by the received PDCCH, and denoted as K0), PDCCH-to-PUSCH slot timing (corresponding to a time gap in slot units between a time point of receiving a PDCCH and a time point of transmitting a PUSCH scheduled by the received PDCCH, and denoted as K2), information on the position and length of a start symbol for which the PDSCH or PUSCH is scheduled within a slot, a mapping type of PDSCH or PUSCH, etc. For example, the base station may notify the UE of information, e.g., as shown in Table 15 or Table 16 below.

TABLE 15

| | |
|---|---|
| PDSCH-TimeDomainResourceAllocationList information element | |
| PDSCH-TimeDomainResourceAllocationList ::= SEQUENCE | |
| (SIZE(1..maxNrofDL-Allocations)) OF PDSCH- | |
| TimeDomainResourceAllocation | |
| PDSCH-TimeDomainResourceAllocation ::= | SEQUENCE { |
| k0 | INTEGER(0..32) |
| | OPTIONAL, -- Need S |
| mappingType | ENUMERATED |
| | {typeA, typeB}, |
| startSymbolAndLength | INTEGER (0..127) |
| } | |

TABLE 16

| | |
|---|---|
| PUSCH-TimeDomainResourceAllocation information element | |
| PUSCH-TimeDomainResourceAllocationList ::= | SEQUENCE |
| (SIZE(1..maxNrofUL-Allocations)) OF PUSCH- | |
| TimeDomainResourceAllocation | |
| PUSCH-TimeDomainResourceAllocation ::= | SEQUENCE { |
| k2 | INTEGER(0..32) OPTIONAL, -- Need S |
| mappingType | ENUMERATED {typeA, typeB}, |
| startSymbolAndLength | INTEGER (0..127) |
| } | |

The base station may notify the UE of one of the entries in the above-described table regarding the time-domain resource allocation information to via L1 signaling (e.g., DCI) (e.g., may be indicated by a "time-domain resource allocation" field in DCI). The UE may acquire time-domain resource allocation information for the PDSCH or PUSCH based on the DCI received from the base station.

Figure 7:
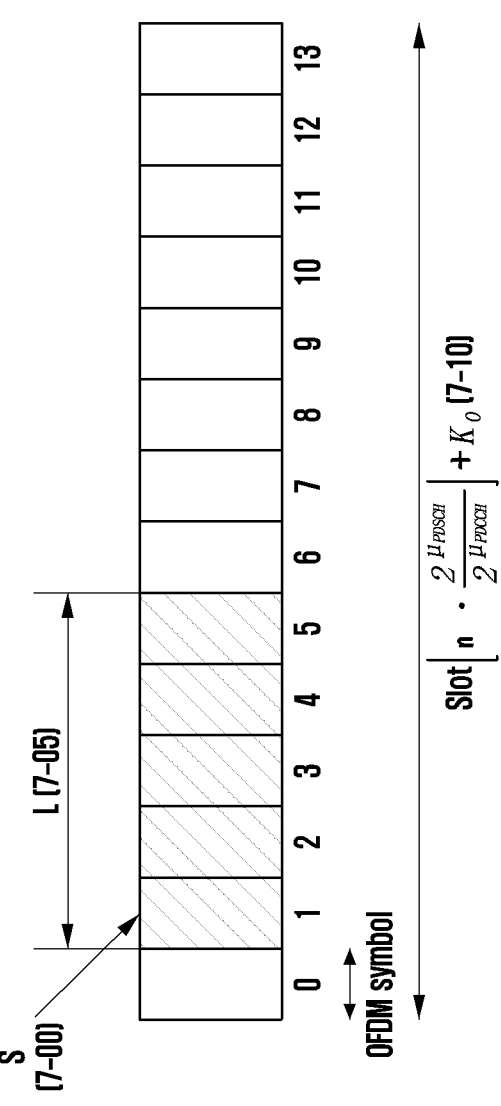
FIG. 7 illustrates a time-domain resource allocation of a PDSCH in a wireless communication system according to an embodiment.

FIG. 7 illustrates time-domain resource allocation of a PDSCH in a wireless communication system according to an embodiment.

Referring to FIG. 7, a base station may indicate a time-domain position of a PDSCH resource according to a start position 7-00 and a length 7-05 of an OFDM symbol in one slot, dynamically indicated based on the subcarrier spacing (SCS) ($\mu_{PDSCH}$, $\mu_{PDCCH}$) of a data channel and a control channel configured using a higher layer, the value of a scheduling offset ($K_0$), and DCI.

Figure 8:
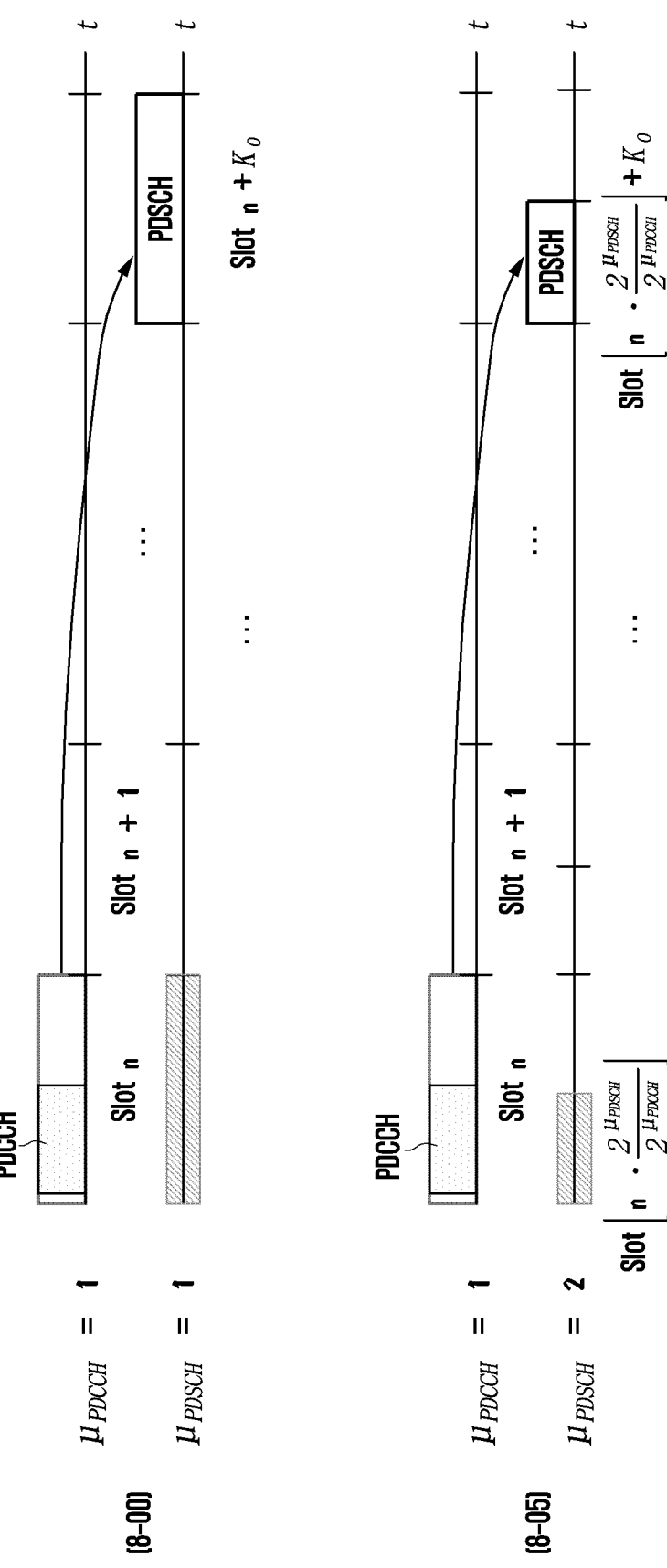
FIG. 8 illustrates a time-domain resource allocation according to a subcarrier spacing of a data channel and a control channel in a wireless communication system according to an embodiment.

FIG. 8 illustrates time-domain resource allocation according to a subcarrier spacing of a data channel and a control channel in a wireless communication system according to an embodiment.

Referring to FIG. 8, if a data channel and a control channel have the same subcarrier spacing (8-00, $\mu_{PDSCH}=\mu_{PDCCH}$), since a data slot number and a control slot number are the same, a base station and a UE may recognize that a scheduling offset occurs in accordance with predetermined slot offset $K_0$. However, when the subcarrier spacing of the data channel and the subcarrier spacing of the control channel are different (8-05, $\mu_{PDSCH}\neq\mu_{PDCCH}$), a data slot number and a control slot number are different, and thus the base station and the UE may recognize that a scheduling offset occurs in accordance with predetermined slot offset $K_0$ based on the subcarrier spacing of the PDCCH.

A beam configuration method in which a base station transmits control information and data to a UE will be described below. In the disclosure, for convenience of explanation, a process of transmitting control information through a PDCCH may be expressed as transmitting the PDCCH, and a process of transmitting data through a PDSCH may be expressed as transmitting the PDSCH.

Figure 9:
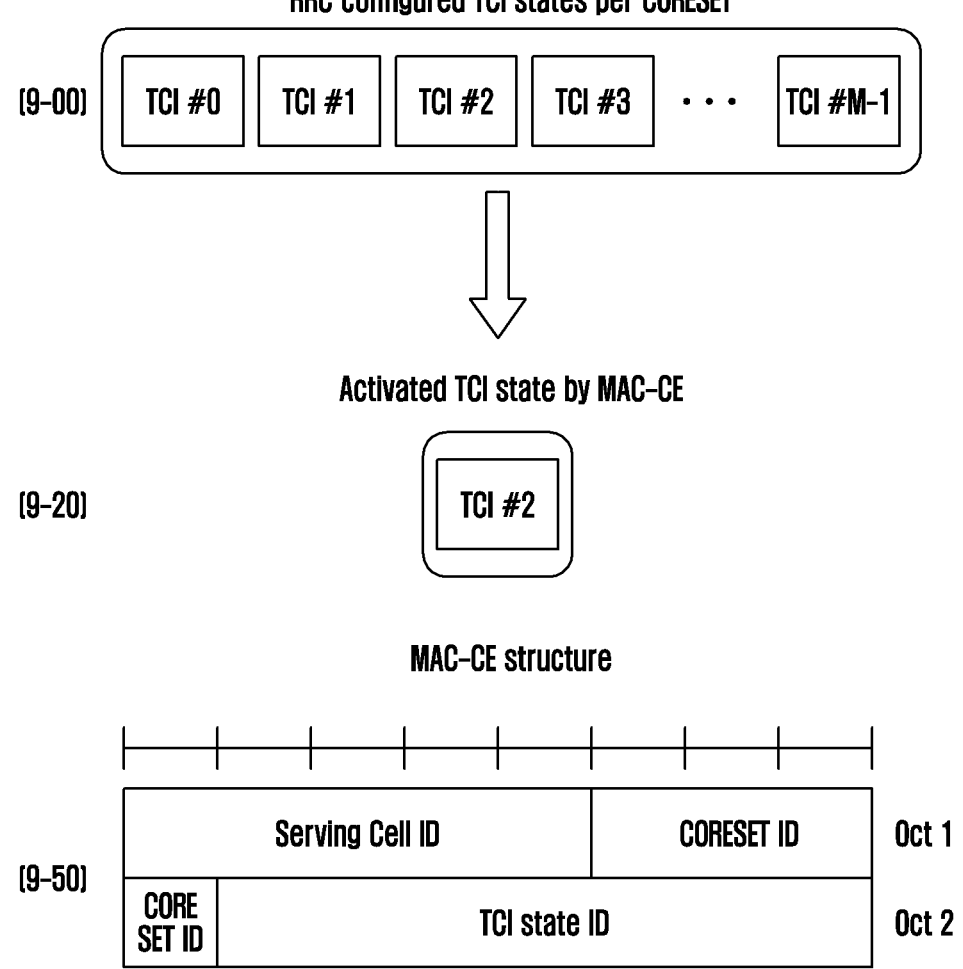
FIG. 9 illustrates a procedure for beam configuration and activation of a PDCCH according to an embodiment.

FIG. 9 illustrates a procedure for beam configuration and activation of a PDCCH according to an embodiment.

Referring to FIG. 9, a list of TCI states for each CORESET may be indicated through a higher layer list such as RRC (9-00). The list of TCI states may be indicated by tci-StatesPDCCH-ToAddList and/or tci-StatesPDCCH-ToReleaseList of Table 8.

Thereafter, one of the list of the TCI states configured for each CORESET may be activated through a MAC-CE (9-20).

Reference numeral 9-50 shows an example of the MAC-CE structure for T state activation of the PDCCH. The fields in the MAC CE and values configurable for each field are shown in Table 17 below.

TABLE 17

| |
|---|
| - Serving Cell ID: This field indicates the identity of the Serving Cell for which the MAC CE applies. The length of the field is 5 bits;<br>- CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;<br>- TCI State ID (identity): This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits. |

Figure 10:
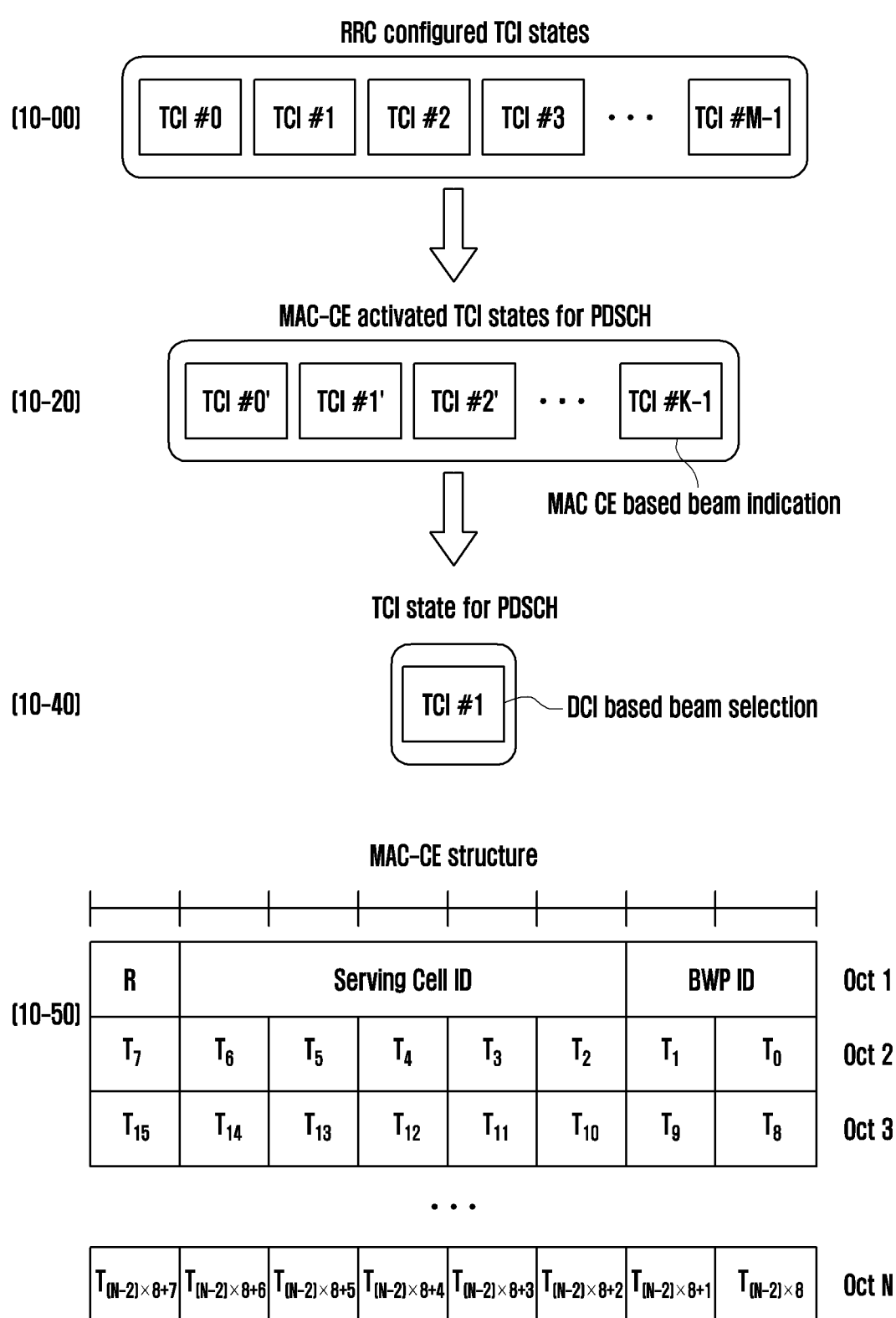
FIG. 10 illustrates a procedure for beam configuration and activation of a PDSCH according to an embodiment.

FIG. 10 illustrates a process for beam configuration and activation of a PDSCH according to the disclosure.

A list of TCI states for a PDSCH may be indicated through a higher layer list such as RRC (10-00). The list of TCI states may be indicated by, for example, tci-States-ToAddModList and/or tci-StatesToReleaseList in PDSCH-Config IE for each BWP. A part of the list of the TCI states may be activated through the MAC-CE (10-20). The maximum number of activated TCI states may be determined according to the capability reported by a UE.

Reference numeral 10-50 shows an example of a MAC-CE structure for TCI state activation/deactivation of a Rel-15-based PDSCH.

The fields in the MAC CE and values configurable for each field are shown in Table 18 below.

The base station may transmit a UE capability enquiry message requesting a capability report to the UE which is in a connected state. The message may include a UE capability request for each radio access technology (RAT) type. The request for each RAT type may include requested frequency band information. Further, the UE capability enquiry message may request multiple RAT types through one RRC message container, or the base station may transmit multiple UE capability enquiry messages including a request for each RAT type to the UE. That is, the UE capability enquiry may be repetitively transmitted multiple times, and the UE may configure a UE capability information message corresponding to the UE capability enquiry and make multiple reports of the UE capability information message.

TABLE 18

| |
|---|
| - Serving Cell ID: This field indicates the identity of the Serving Cell for which the MAC CE applies. The length of the field is 5 bits;<br>- BWP ID: This field indicates a DL BWP for which the MAC CE applies as the codepoint of the DCI BWP indicator field as specified in TS 38.212 [9]. The length of the BWP ID field is 2 bits;<br>- Ti (TCI state ID i): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI TCI field, as specified in TS 38.214 [7]. The Ti field is set to 0 to indicate that the TCI state with TCI-StateId i shall be deactivated and is not mapped to the codepoint of the DCI TCI field. The codepoint to which the TCI State is mapped is determined by its ordinal position among all the TCI States with Ti field set to 1, i.e., the first TCI State with Ti field set to 1 shall be mapped to the codepoint value 0, second TCI State with Ti field set to 1 shall be mapped to the codepoint value 1 and so on. The maximum number of activated TCI states is 8;<br>- R (redundant bit): Reserved bit, set to 0. |

When receiving DCI format 1_1 or DCI format 1_2, the UE may receive a PDSCH through one beam of the TC states activated by the MAC-CE based on information of a TCI field in DCI (10-40). Whether the TCI field exists is determined by a tci-PresentinDCI value, which is a higher layer parameter in a CORESET configured for reception of the DCI. If tci-PresentinDCI is configured to "enabled" in the higher layer, the UE may identify the TCI field of 3 bits information to determine TCI states activated according to a DL BWP or a scheduled CC and the direction of a beam linked to DL-RS.

In LTE and NR, the UE may perform a procedure of reporting the UE-supported capability to the corresponding base station while being connected to the serving base station. In the description below, this procedure is referred to as a UE capability report.

In the next generation telecommunication system, the base station may make a UE capability request for MR-DC including NR, LTE, and EN-DC. In general, the UE capability enquiry message is transmitted initially after the UE establishes a connection with the base station. However, the UE capability enquiry message may be requested by the base station under any condition if necessary.

In the above operation, the UE, which has received a request for a UE capability report from a base station, configures a UE capability according to frequency band information and a RAT type, which are requested by the base station. A method for configuring a UE capability by a UE in the NR system may be summarized as follows:

1. If the UE receives lists of LTE and/or NR frequency bands through a UE capability request from a base station, the UE configures a band combination (BC) of E-UTRAN NR-dual connectivity (EN-DC) and NR stand-alone (SA). That is, the UE configures a candidate BC list for EN-DC and NR SA, based on frequency bands requested, through FreqBandList, from the base station. Further, the bands are prioritized in the order described in the FreqBandList.

2. If the base station requests the UE capability report by setting the "eutra-nr-only" flag or the "eutra" flag, matters relating to NR SA BCs among the configured BC candidate list are completely removed by the UE. This may occur only when the LTE base station (i.e., an eNB) requests "eutra" capability.

3. Thereafter, the UE removes fallback BCs from the candidate BC list configured in the above operation. Here, the fallback BC corresponds to a BC obtainable by removing a band corresponding to at least one SCell band from a random super set BC, and the fallback BC is omittable because a super set BC may already cover the fallback BC. This operation is further applied to multi-radio-DC (MR-DC), i.e., LTE bands. The BCs remaining after performing this operation are the final "candidate BC list".

4. The UE selects BCs to be reported by selecting BCs suitable for the requested RAT type from the final "candidate BC list". In this operation, the UE configures supported-BandCombinationList in a predetermined order. That is, the UE configures a BC and a UE capability to report according to a preconfigured order of RAT type (nr->eutra-nr->eutra). Further, the UE configures featureSetCombination for the configured supportedBandCombinationList and configures a list of "candidate feature set combinations" from a candidate BC list from which a list of fallback BCs (including the same or lower level capabilities) has been removed. The above "candidate feature set combinations" include all of feature set combinations for NR and EUTRA-NA BC, and may be obtained from feature set combinations of containers of UE-NR-Capabilities and UE-MRDC-Capabilities.

5. Further, if the requested RAT type is eutra-nr and makes some influence, featureSetCombinations are included in both containers of the UE-MRDC-Capabilities and UE-NR-Capabilities. However, the feature set of NR includes only UE-NR-Capabilities.

The UE capability is configured and then the UE transmits a UE capability information message including the UE capability to the base station. Thereafter, the base station performs suitable scheduling and transmission/reception management for the corresponding UE, based on the UE capability received from the UE.

When time and frequency resource A for transmission of predetermined symbol sequence A overlaps predetermined time and frequency resource B, a rate matching or puncturing operation may be considered as the transmission/reception operation of channel A in consideration of resource C corresponding to a region in which the resource A and the resource B overlap. A specific operation may follow the details below.

Rate Matching Operation

A base station may map the channel A to only the remaining resource regions except for resource C among the entire resource A for transmission of symbol sequence A to a UE, the resource C corresponding to a region in which the resource B overlap the resource A, and transmit the same. For example, when symbol sequence A is configured by {symbol #1, symbol #2, symbol #3, symbol 4}, the resource A is configured by {resource #1, resource #2, resource #3, resource #4}, and resource B is configured by {resource #3, resource #5}, the base station may sequentially map the symbol sequence A to {resource #1, resource #2, resource #4}, which are the remaining resources except for {resource

3} corresponding to the resource C among the resource A, and transmit the same. As a result, the base station may map the symbol sequence {symbol #1, symbol #2, symbol #3} to {resource #1, resource #2, resource #4}, respectively, and transmit the same.

The UE may determine the resource A and the resource B through scheduling information for symbol sequence A from a base station, and accordingly, the UE may determine resource C corresponding to a region where the resource A and the resource B overlap. The UE may receive the symbol sequence A under an assumption that the symbol sequence A is mapped to the remaining regions except for the resource C among the entire resource A and transmitted. For example, when the symbol sequence A is configured by {symbol #1, symbol #2, symbol #3, symbol 4}, the resource A is configured by {resource #1, resource #2, resource #3, resource #4}, and the resource B is configured by {resource #3, resource #5}, the UE may receive the symbol sequence A under an assumption that the symbol sequence A is sequentially mapped to the remaining resources {resource #1, resource #2, resource #4} except for {resource #3} corresponding to the resource C among the resource A. As a result, the UE assumes that the symbol sequence {symbol #1, symbol #2, symbol #3} are mapped to {resource #1, resource #2, resource #4}, respectively, and transmitted, and may perform a subsequent series of reception operations.

Puncturing Operation

When there is resource C corresponding to a region, in which resource B overlaps the resource A for transmission of symbol sequence A to a UE, a base station may map the symbol sequence A to the entire resource A. However, the base station may not perform transmission in a resource region corresponding to the resource C, and may perform transmission to only the remaining resource regions except for the resource C among the entire resource A. For example, when symbol sequence A is configured by {symbol #1, symbol #2, symbol #3, symbol 4}, resource A is configured by {resource #1, resource #2, resource #3, resource #4}, and resource B is configured by {resource #3, resource #5}, the base station may map the symbol sequence A {symbol #1, symbol #2, symbol #3, symbol #4} to the resource A {resource #1, resource #2, resource #3, resource #4}, respectively. Further, the base station may transmit only the corresponding symbol sequence {symbol #1, symbol #2, symbol #4} to {resource #1, resource #2, resource #4}, which are the remaining resources except for {resource #3} corresponding to the resource C among the entire resource A, and may not transmit {symbol #3} mapped to {resource #3} corresponding to the resource C. As a result, the base station may map the symbol sequence {symbol #1, symbol #2, symbol #4} to {resource #1, resource #2, resource #4}, respectively, and transmit the same.

The UE may determine the resource A and the resource B through scheduling information for symbol sequence A from the base station, and accordingly, the UE may determine the resource C corresponding to a region where the resource A and the resource B overlap. The UE may receive the symbol sequence A under an assumption that the symbol sequence A is mapped to the entire resource A, but transmitted in the remaining regions, except for the resource C among the resource A. For example, when the symbol sequence A is configured by {symbol #1, symbol #2, symbol #3, symbol 4}, the resource A is configured by {resource #1, resource #2, resource #3, resource #4}, and the resource B is configured by {resource #3, resource #5}, the UE may assume that the symbol sequence A {symbol #1, symbol #2, symbol #3, symbol 4} are mapped to {resource #1, resource #2, resource #3, resource #4}, respectively, and that {symbol #3} mapped to {resource #3} corresponding to resource C is not transmitted, and the UE may receive the symbol sequence A under an assumption that the corresponding symbol sequence {symbol #1, symbol #2, symbol #4} are mapped to {resource #1, resource #2, resource #4}, which are the remaining resources except for {resource #3} corresponding to resource C among resource A, and transmitted. As a result, the UE assumes that the symbol sequence {symbol #1, symbol #2, symbol #4} are mapped to {resource #1, resource #2, resource #4}, respectively, and transmitted, and may perform a subsequent series of reception operations.

Hereinafter, a method of configuring a rate matching resource to perform rate matching in a 5G communication system will be described. The rate matching refers to controlling the size of a signal by considering the amount of resources capable of transmitting the signal. For example, the rate matching of a data channel may be understood as that the size of data is adjusted without mapping and transmitting the data channel with respect to a specific time and frequency resource region.

Figure 11A:
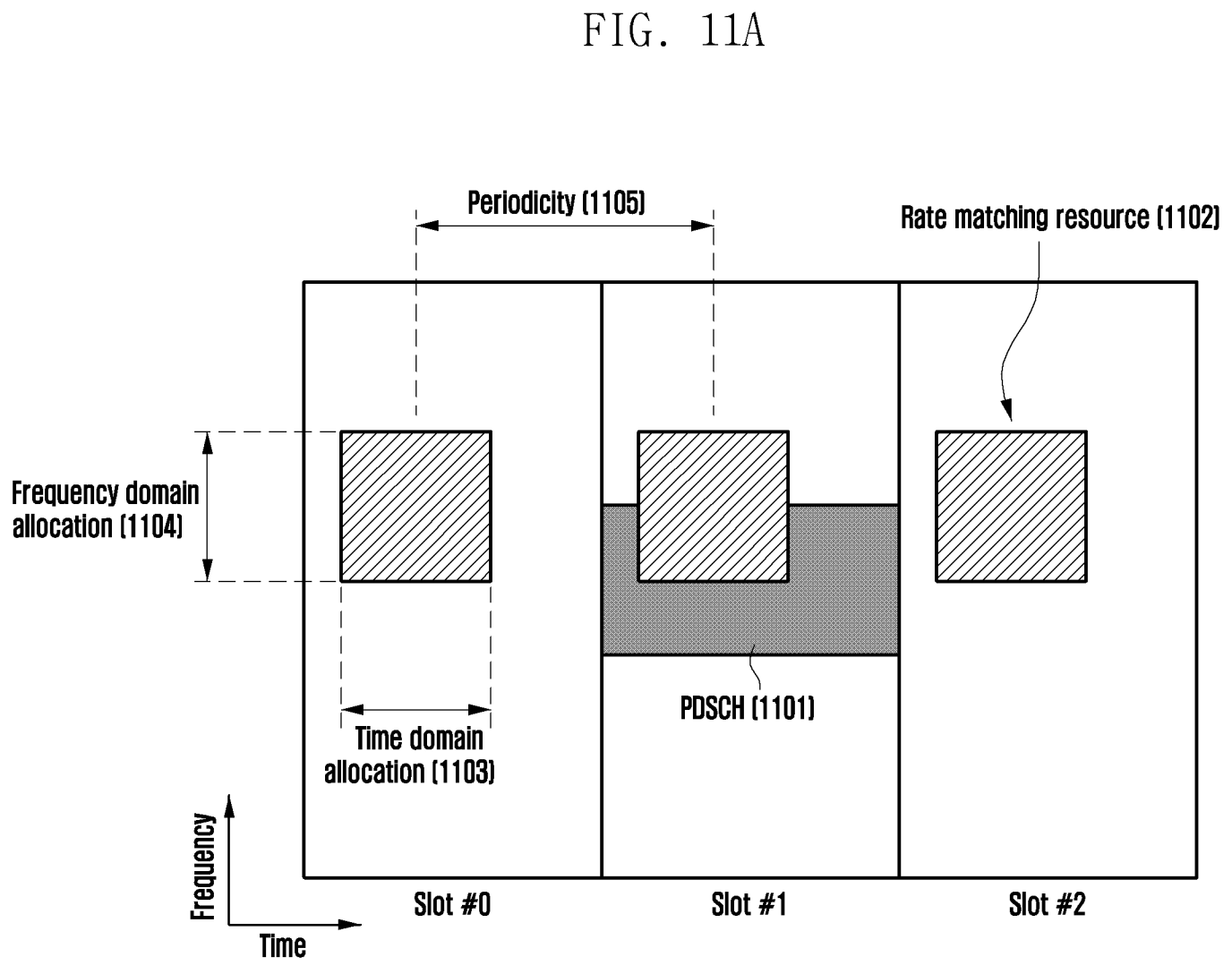

FIG. 11A illustrates a method in which a base station and a UE perform data transmission or reception by considering a DL data channel and a rate matching resource according to an embodiment.

Referring to FIG. 11A, a DL data channel (e.g., a PDSCH) 1101 and a rate matching resource 1102 are provided. The base station may configure one or more rate matching resources 1102 in the UE through higher layer signaling (e.g., RRC signaling). Configuration information of the rate matching resource 1102 may include time-domain resource allocation information 1103, frequency-domain resource allocation information 1104, and period information 1105.

Herein, a bitmap corresponding to the frequency-domain resource allocation information 1104 is called a "first bitmap", a bitmap corresponding to the time-domain resource allocation information 1103 is called a "second bitmap", and a bitmap corresponding to the period information 1105 is called a "third bitmap". If some or all of the time and frequency resources of the scheduled data channel 1101 overlap the configured rate matching resource 1102, a base station may rate-match the data channel 1101 in the rate matching resource part 1102 and transmit the same. A UE may perform data reception and decoding after assuming that the data channel 1101 has been rate-matched in the rate matching resource part 1102.

The base station may dynamically notify the UE of whether the data channel will be rate-matched in the configured rate matching resource part through DCI through an additional configuration (corresponding to a "rate matching indicator" in the DCI format described above). Specifically, the base station may select some of the configured rate matching resources, may group the selected resources into a rate matching resource group, and may indicate whether the data channel has been rate-matched with each rate matching resource group through DCI using a bitmap method to the UE. For example, when four rate matching resources RMR #1, RMR #2, RMR #3 and RMR #4 have been configured, the base station may configure RMG #1={RMR #1, RMR #2} and RMG #2={RMR #3, RMR #4} as rate matching groups, and may indicate whether rate matching in each of RMG #1 and RMG #2 has been performed using 2 bits of a DCI field to the UE in the form of a bitmap. For example, the base station may indicate "1" if rate matching needs to be performed, and may indicate "0" if rate matching does not need to be performed.

5G supports the granularity of "RE level" and "RB symbol level" as a method of configuring the above-described rate matching resource in the UE. More specifically, the following configuration method may be followed.

RB Symbol Level

The UE may receive up to four RateMatchPattern for each BWP via higher layer signaling, and one RateMatchPattern may include the following contents.

A reserved resource in a BWP may include a resource, in which a time and frequency resource region of the corresponding reserved resource is configured as a combination of an RB-level bitmap and a symbol-level bitmap on the frequency axis. The reserved resource may span over one or two slots. The UE may be additionally configured with a time-domain pattern (periodicityAndPattern) in which the time and frequency domain including a pair of RB level and symbol level bitmaps are repeated.

A time and frequency domain resource region configured as a CORESET in a BWP and a resource region corresponding to a time-domain pattern configured as a search space configuration in which the resource region is repeated may be included.

RE Level

The UE may be configured with at least one of the following information through higher layer signaling.

The number of ports (nrofCRS-Ports) and LTE-CRS-vshift(s) value (v-shift) of LTE CRS as configuration information (lte-CRS-ToMatchAround) for RE corresponding to an LTE cell-specific reference signal or common reference signal (CRS) pattern, center subcarrier location information (carrierFreqDL) of an LTE carrier from the reference frequency point (e.g., reference point A), the bandwidth size (carrierBandwidthDL) information of the LTE carrier, subframe configuration information (mbsfn-SubframConfigList) corresponding to a multicast-broadcast single-frequency network (MBSFN), etc., may be included. The UE may determine the location of the CRS in the NR slot corresponding to the LTE subframe based on the above-described information.

Configuration information for a resource set corresponding to one or multiple zero power (ZP) CSI-RSs in the BWP may be included.

In general, when the beam configured for a UE is changed, the beam switching time may be ignored because it is smaller than the cyclic prefix (CP) length. However, if the beam switching time of the UE is longer than the CP length (e.g., when a very large subcarrier spacing such as 960 kHz is used), performance degradation may occur due to reduced received power and broken orthogonality of the OFDM signal. Accordingly, if the beam switching time is not taken into consideration in the above case, a problem may occur that the UE cannot normally receive some or all of the PDSCHs.

The base station may consider a method of not mapping resources with respect to a predetermined symbol during the beam switching time. For example, the base station may not map resources to at least X symbol or symbols corresponding to X ns time duration after a time point at which the beam is changed. The X may refer to the number of symbols and may be referred to as a threshold value or a time duration. The X may be determined as a predetermined number, a number configured by the base station, a number predefined in the base station and the UE, or a number determined according to a specific condition.

Although a method in which X is the number of symbols will be described below as an example, embodiments of the disclosure are not limited thereto. The X may be determined in units of absolute time (ms, μs, etc.) or a method in which other units are used is also possible, and thus X may be referred to as a time duration.

In addition, when the X is configured in the UE, the X value may be configured by higher layer signaling or DCI (or MAC CE). Here, the X value may be used in at least one of a method of indicating any one value through higher layer signaling, a method of providing multiple X values in the form of a list through higher layer signaling and indicating any one of the values using DCI, or a method of indicating the X value using information included in the DCI (or MAC CE).

In addition, the X value may be directly indicated through information transmitted through higher layer signaling or information included in DCI, or the X value may be configured according to whether information corresponding to the X value is included. For example, in a method of configuring the X value according to whether information corresponding to the X value is included, when the X value is not included, a method in which a time required for beam switching between the PDCCH and the PDSCH is not considered or a predetermined default value is used may be used.

According to the 3GPP Rel-15 and Rel-16 NR systems, a UE is configured to receive the DL signal without considering the beam switching time. Therefore, as in the scenario assumed above, when the PDCCH and the PDSCH(s) are transmitted (partially) overlapping and the UE should consider the beam switching time (e.g., when the beam switching time of the UE is longer than the CP length due to the use of a larger subcarrier spacing than the conventional one, such as 960 kHz), the UE may have a difficult to receive the corresponding DL signal while achieving the required performance. In accordance with an embodiment of the disclosure, when a beam switching time is required, a beam operation generated when the PDCCH and the PDSCH having different QCL-typeDs overlap is proposed to improve the PDCCH and PDSCH reception performance of the UE.

Hereinafter, in describing embodiments of the disclosure, several distinguished examples are provided for convenience of explanation, but these are not mutually exclusive and may be applied by appropriately combining with each other according to circumstances.

Figure 11B:
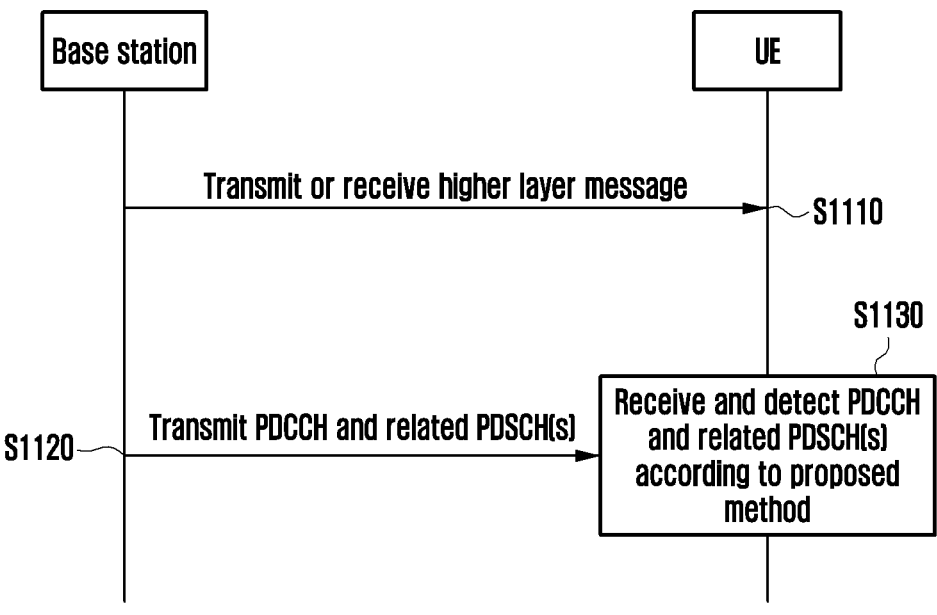
FIG. 11B is a signal flow diagram illustrating operations of a UE and a base station according to an embodiment.

FIG. 11B is a signal flow diagram illustrating operations of a UE and a base station according to an embodiment.

Referring to FIG. 11B, the base station transmits a higher layer message to the UE in S1110. The higher layer message may include configuration information for signal transmission/reception between the base station and the UE. For example, the higher layer message may include RRC signaling, and may include at least one of tci-StatesToAddModList and/or tci-StatesToReleaseList and PDSCH-TimeDomainResourceAllocationList in PDSCH-Config.

The base station may transmit a PDCCH to the UE.

In step S1120, the base station transmits one or more PDSCHs scheduled by the PDCCH.

In response thereto, the UE may operate according to various embodiments described below to receive and detect the PDCCH and one or more PDSCHs scheduled by the PDCCH in step S1130.

First Embodiment: Single PDSCH Reception Default Beam Configuration when PDSCH Overlapping with PDCCH is Transmitted In case that one PDSCH is scheduled through single DCI, the number of symbols between the last symbol of a PDCCH via which DCI indicating PDSCH scheduling is transmitted and the start symbol of a PDSCH scheduled by the DCI or a time duration (hereinafter referred to as PDCCH-to-PDSCH time offset) may exist. For example, the PDCCH-to-PDSCH time offset may be determined by the summation of the number of symbols of the given slot offset (K0) and the PDSCH start symbol index.

In case that the PDCCH-to-PDSCH time offset is less than a specific threshold, the UE may not be able to complete decoding of the PDCCH at the time of receiving the PDSCH. This indicates that the UE does not receive beam information for reception of the PDSCH, i.e., the beam information indicated by DCI of the PDCCH. Therefore, a default beam for PDSCH transmission and reception of the base station and the UE may be designated. That is, in the above situation (when the PDCCH-to-PDSCH time offset is less than a specific threshold), the base station may transmit the PDSCH through the designated default beam, and the UE may perform buffering using the designated default beam.

After performing PDCCH decoding, when the UE determines that there is a PDSCH scheduled at a time point before PDCCH decoding, the UE may perform PDSCH decoding from a signal buffered according to the default beam. Here, the above-described threshold may be a timeDurationForQCL value reported as UE capability. On the other hand, the above-described default beam operation may be limited to a case in which one or more TCI states of the TCI state list 10-00 configured for the PDSCH include QCL-TypeD, that is, is accompanied with the reception beam configuration of the UE. Here, the default beam may be a beam configured in a CORESET (e.g., CORESET #0) corresponding to the lowest ID among CORESETs corresponding to the monitored search space of the most recent slot with reference to the PDSCH reception slot.

FIG. 12 illustrates an operation of a PDSCH default beam according to an embodiment.

Referring to FIG. 12, in DCI transmitted via a PDCCH 12-00, when a TCI field for PDSCH reception indicates TCI state #n 12-10, if the PDCCH-to-PDSCH time offset is shorter than timeDurationforQCL 12-20, and one or more TCI states of the TCI state list configured via RRC for the PDSCH 12-40 include QCL-TypeD, a default beam 12-60 is applied to the PDSCH.

In case that the parameter tci-PresentinDCI in CORESET is not configured or the PDSCH is scheduled in DCI format 1_0, the UE does not receive a beam for PDSCH reception through DCI because the TCI field in DCI does not exist. Here, when the PDCCH-to-PDSCH time offset is greater than or equal to the timeDurationForQCL value, the UE assumes that the beam for PDSCH reception is the same as the beam configured/activated in CORESET for PDCCH transmission, and the base station may configure the PDSCH transmission beam based on the assumption of the UE.

When the parameter tci-PresentinDCI in CORESET is configured, the UE may recognize that the TCI field in DCI format 1_1 exists. If the PDCCH-to-PDSCH time offset is greater than or equal to the timeDurationForQCL value, the UE may configure a beam for PDSCH reception according to the indication of the TCI field in the detected DCI.

<Situation 1: Transmission of a Single PDSCH Overlapping with a PDCCH Including Scheduling DCI>

A UE may search for a PDCCH including DCI for scheduling a single PDSCH in a configured search region. Here, the PDSCH is scheduled based on a slot offset (K0) of the discovered DCI and a start symbol (S) within a slot. For example, if the value of slot offset is 0, a situation may occur such that the PDSCH is scheduled in the same slot as that of the scheduling PDCCH and the PDCCH and the PDSCH overlap both in a time domain and a time-frequency domain according to the start symbol of the PDSCH. In Rel-15/16 NR, when the QCL-typeD of the PDCCH is different from that of the PDSCH and a symbol spacing between the scheduling PDCCH and the scheduled PDSCH is less than timeDurationForQCL, when the PDCCH and PDSCH are received while overlapping in at least one symbol, the UE may prioritize the reception of a CORESET associated with the PDCCH.

Figure 13:
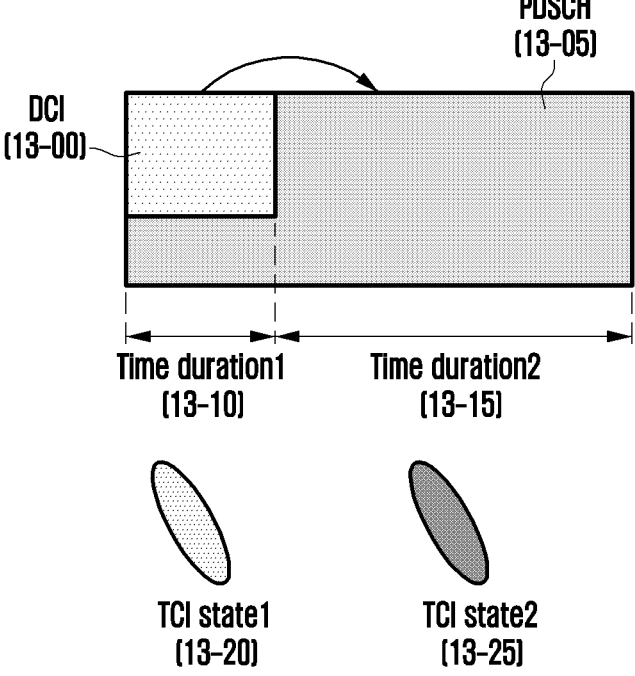
FIG. 13 illustrates transmission of a single PDSCH overlapping with a PDCCH including scheduling DCI according to an embodiment.

FIG. 13 illustrates transmission of a single PDSCH overlapping with a PDCCH including scheduling DCI according to an embodiment.

Referring to FIG. 13, the UE may receive a single scheduled PDSCH 13-05 overlapping with a PDCCH including scheduling DCI 13-00. Here, the UE may receive the PDCCH and the PDSCH by using TCI state (QCL/TCI) 13-20 of the CORESET associated with the PDCCH during time duration 1 13-10, and may receive the PDSCH by using default TCI state (default QCL/TCI) 13-25 described above during time duration 2 13-15.

The TC state (QCL/TCI) of a CORESET with the lowest CORESET ID included in the latest slot in which a CORESET is monitored by the UE may be used as the default TCI state (default QCL/TCI) 13-25, and this may be the same as or different from the TCI state (QCL/TCI) of a CORESET associated with a PDCCH including scheduling DCI.

If the two TCI states (QCL/TCI) 13-20 and 13-25 are the same, the UE may receive the PDCCH 13-00 and the PDSCH 13-05 based on one TCI state (QCL/TCI). If the two TCI states (QCL/TCI) are different and a beam switching time is not required, the UE may receive the PDCCH 13-00 and the PDSCH 13-05 based on different TCI states (QCL/TCI). If the two TCI states (QCL/TCI) 13-20 and 13-25 are different and a beam switching time is required, the UE may not provide the expected performance because it cannot provide a beam switching time required between time duration 1 13-10 and time duration 2 13-15. Here, the following operation may be expected for default beam configuration for a single PDSCH.

Method 1-1: Method for Avoiding the Above Situation by Scheduling

The base station may prevent the above situation from occurring through PDSCH scheduling. For example, the base station may schedule the PDSCH by adjusting the value of a slot offset (K0) and the value of a symbol (S) within a slot, so as to allow a distance between the last symbol of the scheduling PDCCH and the first symbol of the scheduled PDSCH to be at least X symbol or to be greater than or equal to a symbol corresponding to X ns time duration. Accordingly, the UE may expect (or assume) that the distance between the last symbol of the PDCCH and the first symbol of the PDSCH is scheduled to greater than or equal to X symbol. Here, the first symbol of the PDSCH may refer to one of the first symbol indicated through the time domain resource allocation (TDRA) field of DCI, a symbol used to transmit a cyclic prefix extension (CP extension) indicated through the DCI field (e.g., ChannelAccess-CPext), or a start time point of the CP extension. The X may refer to the number of symbols and may be referred to as a threshold value or a time duration. The X may be determined as a predetermined number, a number configured by the base station, a number predefined in the base station and the UE, or a number determined according to a specific condition. In addition, although it is described as an example that X is the number of symbols, the embodiment of the disclosure is not limited thereto. The X may be determined in units of absolute time (ms, µs, etc.) or a method in which other units are used is also possible, and thus X may be referred to as a time duration.

In addition, when the X is configured in the UE, the X value may be configured by higher layer signaling or DCI (or MAC CE). Here, the X value may be determined using at least one of a method of indicating any one value through higher layer signaling, a method of providing multiple X values in the form of a list through higher layer signaling and indicating any one of the values using DCI (or MAC CE), or a method of indicating the X value using information included in the DCI. In addition, the X value may be directly indicated through information transmitted through higher layer signaling or information included in DCI, or the X value may be configured according to whether information corresponding to the X value is included. For example, as a method of configuring the X value according to whether information corresponding to the X value is included, a method in which a time required for beam switching between the PDCCH and the PDSCH is not considered when the X value is not included, or a predetermined default value is used may be used.

Method 1-2: Method in which Both a PDCCH and a PDSCH Use the Same TCI State (QCL/TCI)

When the TCI state (QCL/TCI) used for receiving the PDSCH is the same as the TCI state (QCL/TCI) of a CORESET associated with the PDCCH including scheduling DCI, the UE may receive the PDCCH and the PDSCH based on the same TCI state (QCL/TCI). The base station may configure the TC state (QCL/TCI) of DM-RS of the scheduled PDSCH to be the same as the TCI state (QCL/TCI) of a CORESET associated with the PDCCH including scheduling DCI. For example, the base station may configure the TCI state (QCL/TCI) of a CORESET having the lowest index of the latest slot before receiving the scheduled PDSCH to be equal to the TCI state (QCL/TCI) of a CORESET associated with the PDCCH including scheduling DCI. Alternatively, the TCI state (QCL/TCI) used when receiving the scheduled PDSCH may always be the same as the TCI state (QCL/TCI) of the CORESET of the PDCCH including scheduling DCI.

Method 1-3: Method of Providing a Predetermined Symbol Spacing Between PDCCH and PDSCH In the above situation, When the size of a symbol, except for symbols of the PDSCH scheduled through DCI overlapping with symbols of a PDCCH, that is, time duration 2 13-15 is less than or equal to time duration X of a beam switching time, the UE may not receive a PDSCH located at time duration 2 13-15 (or the UE may expect not to receive the PDSCH located at time duration 2 13-15).

When the size of a symbol, except for symbols of the PDSCH scheduled through DCI overlapping with symbols of a PDCCH, i.e., the time duration 2 13-15 is greater than time duration X of a beam switching time, the base station may transmit the PDSCH through the remaining symbols, except for a symbol corresponding to at least time duration X from a symbol, after the last symbol of a PDCCH including scheduling DCI, by using a rate matching operation and a puncturing operation.

If the DM-RS of the PDSCH is included in a symbol corresponding to at least after time duration X from a symbol after the last symbol of a PDCCH including scheduling DCI, the DM-RS of the PDSCH may be moved to the subsequent symbol and transmitted. For example, when the last symbol index of the PDCCH including scheduling DCI is "n", and a symbol corresponding to at least after time duration X from a symbol having index n is "n+X", the first symbol of the DM-RS may be located in a symbol having index of "n+X+a" (for example, a=1). The value of "a" may be changed based on the configuration or transmission situation of the base station, but the moved DM-RS may not be located after a slot boundary or after a symbol for which the PDSCH is scheduled.

<Situation 2: Transmission of a Single PDSCH Overlapping with a PDCCH Other Than a PDCCH Including Scheduling DCI>

In case that a PDCCH including scheduling DCI and a scheduled PDSCH are not transmitted in an overlapping manner, and a scheduling offset of the PDSCH is smaller than timeDurationForQCL, the UE may detect the PDCCH in the same time domain or time-frequency domain as that of the PDSCH. In Rel-15/16 NR, if the QCL-typeD of the PDCCH is different from that of the PDSCH, and a symbol spacing between the scheduling PDCCH and the scheduled PDSCH is less than timeDurationForQCL, when the PDCCH and the PDSCH are received while overlapping in at least one symbol, the UE may prioritize the reception of a CORESET associated with the PDCCH.

Figure 14:
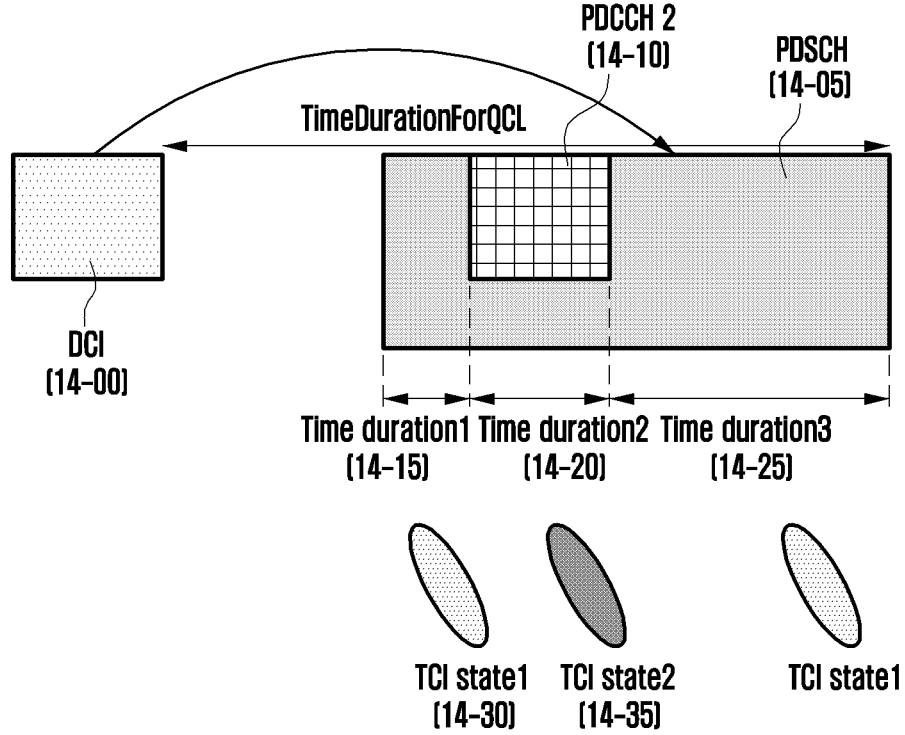
FIG. 14 illustrates transmission of a single PDSCH overlapping with a PDCCH other than a PDCCH including scheduling DCI according to an embodiment of the disclosure.

FIG. 14 illustrates transmission of a single PDSCH overlapping with a PDCCH other than a PDCCH including scheduling DCI according to an embodiment.

Referring to FIG. 14, the UE may receive a PDCCH including scheduling DCI (14-00), and may receive a single scheduled PDSCH 14-05 overlapping with a PDCCH 14-10. Here, the UE may receive the PDSCH by using default TCI state (default QCL/TCI) 14-30 described above during time duration 1 14-15. As the default TCI state (default QCL/TCI) 14-30, the TCI state (QCL/TCI) of a CORESET with the lowest CORESET ID included in the latest slot in which a CORESET is monitored by the UE may be used, and this may be the same as or different from the TCI state (QCL/TCI) of a CORESET associated with a PDCCH including scheduling DCI.

Further, when the PDCCH and the PDSCH are received while overlapping in at least one symbol, the UE prioritizes the reception of a CORESET associated with the PDCCH, and thus the UE may receive the PDCCH and the PDSCH by using TCI state (QCL/TCI) 14-35 of CORESET associated with the PDCCH during time duration 2 14-20. In addition, the UE may receive the PDSCH using the default TCI state (QCL/TCI) 14-30 described above during time duration 3 14-25.

If the two TCI states (QCL/TCI) 14-30 and 14-35 are the same, the UE may receive the PDCCH 14-10 and the PDSCH 14-05 based on one TCI state (QCL/TCI). If the two TCI states (QCL/TCI) are different and a beam switching time is not required, the UE may receive the PDCCH 14-10 and the PDSCH 14-05 based on different TCI states (QCL/TCI). If the two TCI states (QCL/TCI) 14-20 and 14-25 are different and a beam switching time is required, the UE may not provide the expected performance because it may not provide a beam switching time required between time duration 1 14-10 and time duration 2 14-20 or between time duration 2 14-20 and time duration 3 14-25. Here, the following operation may be expected for default beam configuration for a single PDSCH. Time duration 1 14-15 and time duration 3 14-25 may have a value of 0 or more depending on the symbol position in which the PDCCH 14-10 is searched for. In addition, for convenience of explanation, the PDCCH 14-10 is defined as PDCCH2.

Method 2-1: Method for Avoiding the Above Situation by Scheduling

The base station may prevent the above situation from occurring through PDSCH scheduling. For example, the base station may schedule the PDSCH by adjusting the value of a slot offset (K0), the value of a symbol (S) within a slot, and the symbol length ($l_d$) of PDSCH, so as to allow a distance between the last symbol of the scheduling PDCCH2 and the first symbol of the scheduled PDSCH to be at least time duration X.

Alternatively, the base station may schedule the PDSCH so that a distance between the first symbol of the scheduling PDCCH2 and the last symbol of the scheduled PDSCH is to be at least time duration X.

Specific details of the time duration X are the same as described above, and will be omitted below.

Method 2-2: Method in which Both a PDCCH and a PDSCH Use the Same TCI State (QCL/TCI)

In the above situation,

In case that time duration 1 14-15 has a value of 0, i.e., when at least one symbol of PDCCH2 overlaps with the first symbol of PDSCH, the UE may receive a PDSCH by using the same TCI state (QCL/TCI) as the TCI state (QCL/TCI) of a CORESET associated with PDCCH2.

In case that time duration 1 14-15 has a value greater than 0, i.e., when a symbol of PDCCH2 overlaps other symbols other than the first symbol of PDSCH, and a search region in which a CORESET associated with PDCCH2 is searched for is a common search region, the UE may receive the PDSCH by using the same TCI state (QCL/TCI) as the TCI state (QCL/TCI) of a CORESET associated with PDCCH2.

In case that time duration 1 14-15 has a value greater than 0, i.e., when a symbol of PDCCH2 overlaps other symbols except for the first symbol of PDSCH, and a search region in which a CORESET associated with PDCCH2 is searched for is a common search region, the UE may receive a CORESET associated with the PDSCH 2 by using the same TCI state (QCL/TCI) as the TCI state (QCL/TCI) used for PDCCH reception.

Method 2-3: Method of Providing a Predetermined Symbol Spacing Between PDCCH and PDSCH In the above situation, when time duration 1 is at least greater than time duration X, the base station may perform a rate matching operation and a puncturing operation for the remaining symbols except for the last X symbol of the time duration 1.

Alternatively, when time duration 3 is at least greater than time duration X, the base station may perform a rate matching operation and a puncturing operation for the remaining symbols except for symbols from the first to the X symbol of the time duration 1. If the size of time duration 1 or time duration 3 is less than or equal to time duration X, the UE may not receive a PDSCH corresponding to time duration 1 and time duration 3.

Alternatively, if the size of time duration 1 or time duration 3 is less than or equal to time duration X, the UE may expect not to receive a PDSCH corresponding to time duration 1 and time duration 3.

If the DM-RS of the PDSCH is included in a symbol corresponding to at least before time duration X from a symbol before the first symbol of PDCCH2, or the DM-RS of the PDSCH is included in a symbol corresponding to at least after time duration X from a symbol after the last symbol of PDCCH2, the DM-RS of the PDSCH may be moved to the scheduled symbol and transmitted. For example, when the last symbol index of the PDCCH2 is "n", and a symbol corresponding to at least after time duration X from a symbol after the symbol having index n is "n+X", the first symbol of the PDSCH DM-RS may be located in a symbol having index of "n+X+a" (for example, a=1). The value of "a" may be changed based on the configuration or transmission situation of the base station, but the moved DM-RS may not be located after a slot boundary or after a symbol for which the PDSCH is scheduled.

Method 2-4: Method in which No PDCCH is Searched for

In the above situation, the UE may not expect PDCCH search as long as symbols for which the PDSCH has been scheduled are concerned. Here, restriction on the maximum number of PDCCH candidates to be monitored by the UE and restriction on the maximum number of CCEs may be changed, with regard to each slot or each span, according to UE capability report, as long as no search is needed. For example, UE capability report of r15monitoringcapability may be defined for each slot, and UE capability report of r16monitoringcapability may be defined for each span.

In case that a search region in which a CORESET associated with PDCCH2 is searched for is a common search region, and when PDCCH2 and PDSCH overlap in a time-frequency domain, the UE does not perform transmission to a resource region in which PDCCH2 and PDSCH overlap, and may perform rate matching or puncturing operation on a PDSCH resource region except for the overlapped resource region.

In case that a search region in which a CORESET associated with PDCCH2 is searched for is a UE-specific search region, and when PDCCH2 and PDSCH overlap in a time-frequency domain, the UE may perform transmission to a resource region, in which PDCCH2 and PDSCH overlap, regarding as a PDSCH resource region.

Second Embodiment: Multiple PDSCH Reception Default Beam Configuration when PDSCH Overlapping with PDCCH is Transmitted In general, the UE is scheduled for PDSCH reception or PUSCH transmission for delivering one or two TBs through one piece of DCI information. Hereinafter, the disclosure will be described assuming a PDSCH for convenience of explanation, but in the description below, an operation of receiving the PDSCH using a specific beam may be extended and applied to an operation in which the UE transmits the PUSCH using a specific beam corresponding to the corresponding time point. Configuration information regarding the beam may be determined by higher layer signaling or DCI. In scheduling of N PDSCHs, the above method maximizes the PDSCH reception performance of the UE by independently scheduling the N PDSCHs through different scheduling information for every PDSCH, that is, N pieces of DCI. However, excessive power consumption of the UE for DCI reception and/or excessive use of resources by the base station for DCI transmission may occur. For example, in a case of a UE requiring reception of 8 PDSCHs, 8 PDCCH receptions and decodings are required, and resources for transmitting the 8 PDCCHs are required. If reception of multiple PDSCHs (or PUSCH transmission) for delivering multiple TBs can be scheduled through one DCI information (hereinafter referred to as multi-PDSCH scheduling), power consumption of the UE and unnecessary resource use can be minimized.

Figure 15:
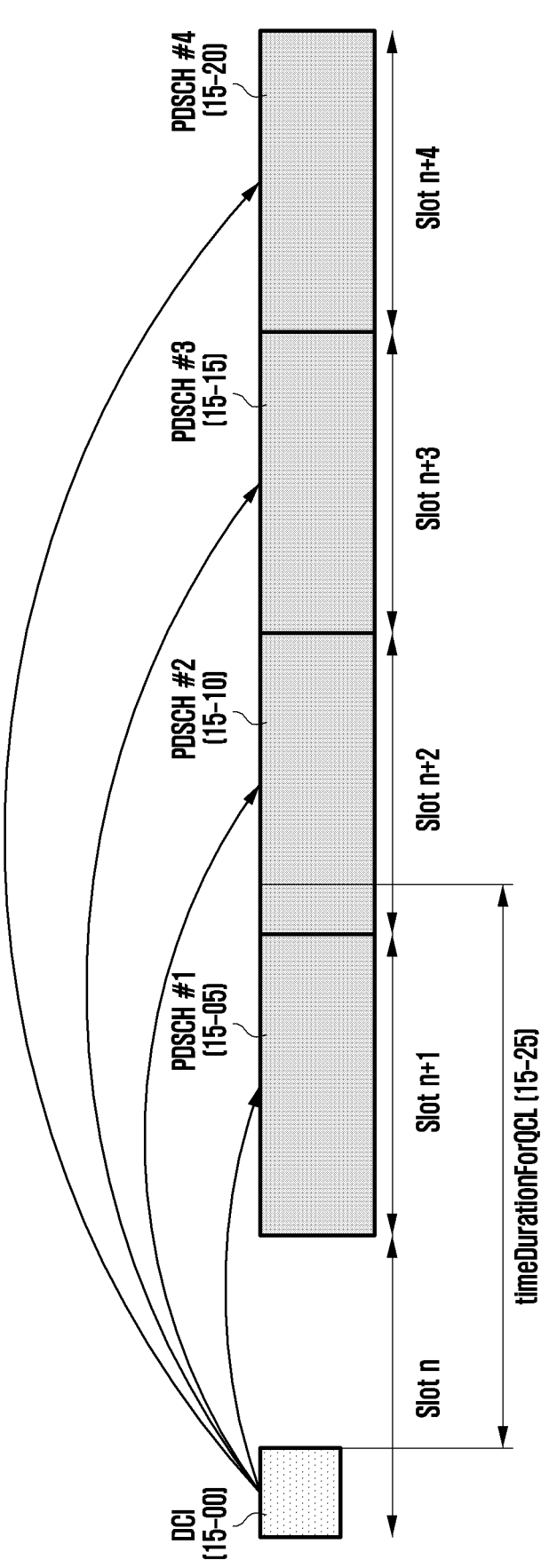
FIG. 15 illustrates multi-PDSCH scheduling according to an embodiment.

FIG. 15 illustrates multi-PDSCH scheduling according to an embodiment.

Referring to FIG. 15, a base station may be configured to schedule one or multiple PDSCHs 15-05, 15-10, 15-15, and 15-20 through single DCI 15-00 transmitted through a PDCCH. Each PDSCH may be configured to indicate a different slot offset through DCI information, or only the first PDSCH may be indicated with a slot offset (K0). If only the first PDSCH is indicated with a slot offset, multiple PDSCHs may be placed in consecutive slots. In addition, the PDSCHs may be scheduled with different start and length indicator values (SLIVs) and mapping types on the time domain according to a TDRA table row index, or each PDSCH may have the same SLIV and mapping type. Each PDSCH may use the same frequency resource. The base station may transmit one or more different TBs or may repeatedly transmit the same TB through each PDSCH.

Although an example in which multiple PDSCHs are located in consecutive slots is described herein, the scope of the disclosure is not limited thereto. The base station may notify the UE of a spacing between PDSCHs through information indicating a symbol or absolute time unit, and accordingly, multiple PDSCHs having a predetermined spacing may be configured. In addition, the base station may notify the UE of a spacing between the PDSCHs by using various information capable of indicating a time duration in addition to the symbol or absolute time.

An operation of the multi-PDSCH default beam may be expected as follows.

When scheduling DCI (15-00) transmitted through PDCCH and a PDCCH-to-PDSCH time offset are shorter than timeDurationforQCL, and at least one TCI state among the TCI state list for PDSCH configured via RRC includes QCL-TypeD, a default TCI state (default QCL/TCI) is applied to the PDSCH. Here, the default TCI state (default QCL/TCI) may be a TCI state (QCL/TCI) configured in a CORESET (e.g., CORESET #0) corresponding to the lowest ID among CORESETs corresponding to a search region of the most recent slot based on a reception slot of each of the multiple PDSCHs, or may be a TCI state (QCL/TCI) configured in a CORESET corresponding to the lowest ID among CORESETs corresponding to a search region of the most recent slot based on a reception slot of the first transmitted PDSCH among the multiple PDSCHs.

<Situation 1: Transmission of Multiple PDSCHs Overlapping with a PDCCH Including Scheduling DCI>

A UE may search for a PDCCH including DCI for scheduling multiple PDSCHs in a configured search region. Here, the first transmitted PDSCH among multiple PDSCHs is scheduled based on a slot offset (K0) of the discovered DCI and a start symbol (S) within a slot. For example, if the value of a slot offset is 0, a situation may occur such that the first transmitted PDSCH among multiple PDSCHs and the scheduling PDCCH are scheduled in the same slot and the PDCCH and the PDSCH overlap both in a time domain and a time-frequency domain according to the start symbol of the PDSCH. In Rel-15/16 NR, when the QCL-typeD of the PDCCH is different from that of the PDSCH and a symbol spacing between the scheduling PDCCH and the scheduled PDSCH is less than timeDurationForQCL, when the PDCCH and PDSCH are received while overlapping in at least one symbol, the UE may prioritize the reception of a CORESET associated with the PDCCH.

Figure 16:
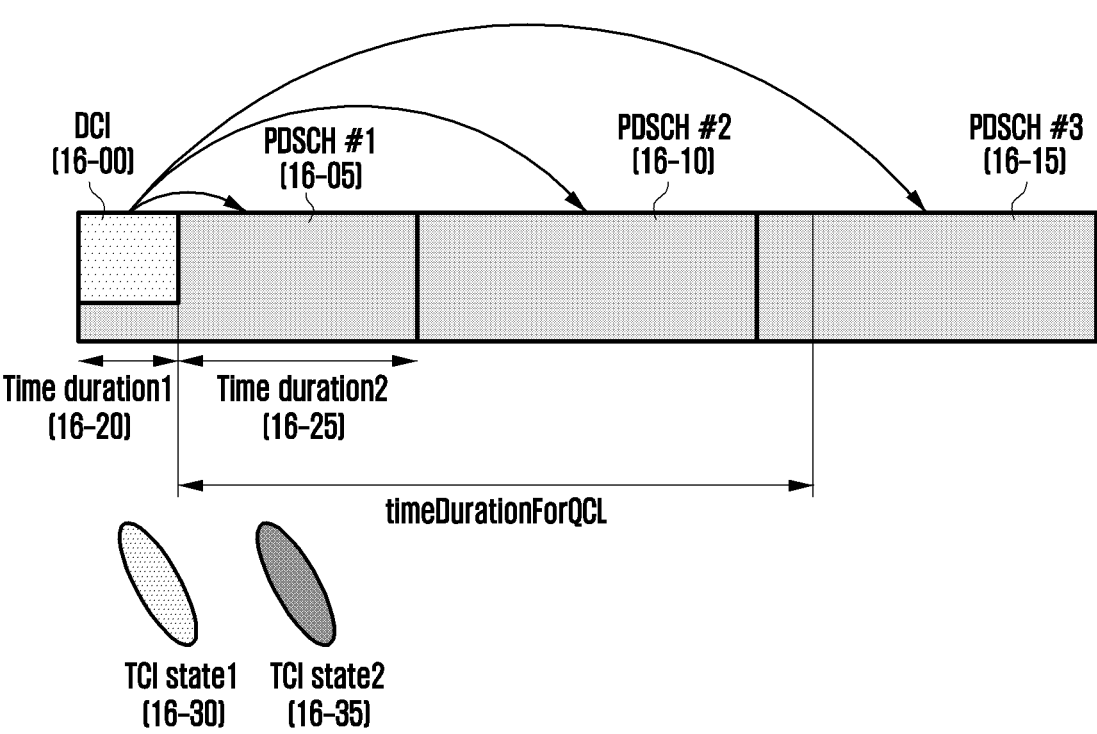
FIG. 16 illustrates transmission of multiple PDSCHs overlapping with a PDCCH including scheduling DCI according to an embodiment.

FIG. 16 illustrates transmission of multiple PDSCHs overlapping with a PDCCH including scheduling DCI according to an embodiment.

Referring to FIG. 16, the UE may receive a PDCCH including scheduling DCI (16-00) overlapping with a first transmitted PDSCH #1 16-05 among multiple scheduled PDSCHs. Here, the UE may receive the PDCCH and the PDSCH #1 by using TCI state (QCL/TCI) 16-30 of the CORESET associated with the PDCCH during time duration 1 16-20, and may receive the PDSCH #1 by using default TCI state (default QCL/TCI) 16-35 described above during time duration 2 16-25.

The TCI state (QCL/TCI) of a CORESET with the lowest CORESET ID included in the latest slot in which a CORE-SET is monitored by the UE may be used as the default TCI state (default QCL/TCI) 16-25, and this may be the same as or different from the TCI state (QCL/TCI) of a CORESET associated with PDCCH including scheduling DCI. The UE may receive PDSCH #2 16-10 and PDSCH #3 16-15 by using the default TCI state (QCL/TCI) 16-35 described above.

If the two TC states (QCL/TCI) 16-30 and 16-35 are the same, the UE may receive the PDCCH 16-00 and the PDSCH 16-05 based on one TCI state (QCL/TCI). If the two TCI states (QCL/TCI) are different and a beam switching time is not required, the UE may receive the PDCCH 16-00 and the PDSCH #1 16-05 based on different TCI states (QCL/TCI). If the two TCI states (QCL/TCI) 16-20 and 16-25 are different and a beam switching time is required, the UE may not provide the expected performance because it may not provide a beam switching time required at the time of transition from time duration 1 16-20 to time duration 2 16-25. Here, the following operation may be expected for default beam configuration for multiple PDSCHs.

Method 3-1: Method for Avoiding the Above Situation by Scheduling

When multiple PDSCHs are scheduled in the above situation, multiple PUSCHs and PDCCH including scheduling DCI may be received using a method of replacing a single PDSCH of the "method 1-1" by the first transmitted PDSCH #1 among the multiple PDSCHs.

That is, the base station may prevent the above situation from occurring through PDSCH #1 scheduling. For example, the base station may schedule the PDSCH #1 by adjusting the value of a slot offset (K0) and the value of a symbol (S) within a slot, so as to allow a distance between the last symbol of the scheduling PDCCH and the first symbol of the scheduled PDSCH #1 to be at least X symbol or to be greater than or equal to a symbol corresponding to X ns time duration. Accordingly, the UE may expect (or assume) that the distance between the last symbol of the PDCCH and the first symbol of the PDSCH #1 is scheduled to be greater than or equal to X symbol.

The X may refer to the number of symbols and may be referred to as a threshold value or a time duration. The X may be determined as a predetermined number, a number configured by the base station, a number predefined in the base station and the UE, or a number determined according to a specific condition.

In addition, although it is described as an example that X is the number of symbols, the embodiment of the disclosure is not limited thereto. The X is determined in units of absolute time (ms, μs, etc.) or a method in which other units are used is also possible, and thus X may be referred to as a time duration.

In addition, when the X is configured in the UE, the X value may be configured by higher layer signaling or DCI. Here, the X value may be determined using at least one of a method of indicating any one value through higher layer signaling, a method of providing multiple X values in the form of a list through higher layer signaling and indicating any one of the values using DCI, or a method of indicating the X value using information included in the DCI.

In addition, the X value may be directly indicated through information transmitted through higher layer signaling or information included in DCI, or the X value may be con-figured according to whether information corresponding to the X value is included. For example, as a method of configuring the X value according to whether information corresponding to the X value is included, a method in which a time required for beam switching between the PDCCH and the PDSCH is not considered when the X value is not included, or a predetermined default value is used may be used.

Other specific details are similar to the above-described method 1-1, and will be omitted below.

Method 3-2: Method in which Both a PDCCH and a PDSCH Use the Same TCI State (QCL/TCI)

When the TCI state (QCL/TCI) used for receiving mul-tiple PDSCHs is the same as the TCI state (QCL/TCI) of a CORESET associated with a PDCCH including scheduling DCI, the UE may receive the PDCCH and the multiple PDSCHs based on the same TCI state (QCL/TCI). The base station may configure the TCI state (QCL/TCI) of DM-RSs of the multiple scheduled PDSCHs to be the same as the TCI state (QCL/TCI) of a CORESET associated with a PDCCH including scheduling DCI. For example, the base station may configure the TCI state (QCL/TCI) of a CORESET having the lowest index of the latest slot before receiving the multiple scheduled PDSCHs to be equal to the TCI state (QCL/TCI) of a CORESET associated with the PDCCH including scheduling DCI.

Alternatively, the TCI state (QCL/TCI) used when receiv-ing the multiple scheduled PDSCHs may always be the same as the TCI state (QCL/TCI) of the CORESET of the PDCCH including scheduling DCI.

Method 3-3: Method of Providing a Predetermined Symbol Spacing Between PDCCH and PDSCH In case that multiple PDSCHs are scheduled in the above situation, the UE may receive multiple PUSCHs and PDCCH including scheduling DCI by using a method of replacing a single PDSCH of the "Method 1-3" by the first transmitted PDSCH #1 among the multiple PDSCHs.

<Situation 2: Transmission of Multiple PDSCHs Overlap-ping with a PDCCH Other Than a PDCCH Including Scheduling DCI>

The UE may be configured to schedule multiple PDSCHs having a scheduling offset smaller than timeDuration-ForQCL through one DCI. It may be assumed that there is no spacing between the multiple PDSCHs. In other words, the last symbol of the first transmitted PDSCH from among the multiple PDSCHs and the first symbol of the next transmitted PDSCH may be adjacent, and the first and last symbols of the N PDSCHs in the middle may be adjacent to the first and last symbols of other PDSCHs, and the first symbol of the last transmitted PDSCH may be adjacent to the last symbol of the immediately before transmitted PDSCH. Here, a situation may occur such that a PDCCH including scheduling DCI and multiple pieces of DCI do not overlap in a time domain, and another PDCCH overlapping the multiple scheduled PDSCHs in a time or time-frequency domain is searched for in the configured search region.

In Rel-15/16 NR, if the QCL-typeD of the PDCCH is different from that of the PDSCH and a symbol spacing between the scheduling PDCCH and the scheduled PDSCH is less than timeDurationForQCL, when the PDCCH and PDSCH are received while overlapping in at least one symbol, the UE may prioritize the reception of a CORESET associated with the PDCCH.

Although it is described that there is no spacing between the multiple PDSCHs as an example, the scope of the disclosure is not limited thereto. The base station may notify the UE of a spacing between PDSCHs in units of symbol or absolute time, and accordingly, a method of the disclosure may be applied to a case in which multiple PDSCHs having a predetermined spacing are configured. In addition, the base station may notify the UE of a spacing between the PDSCHs by using various information capable of indicating a time duration in addition to the symbol or absolute time.

Figure 17:
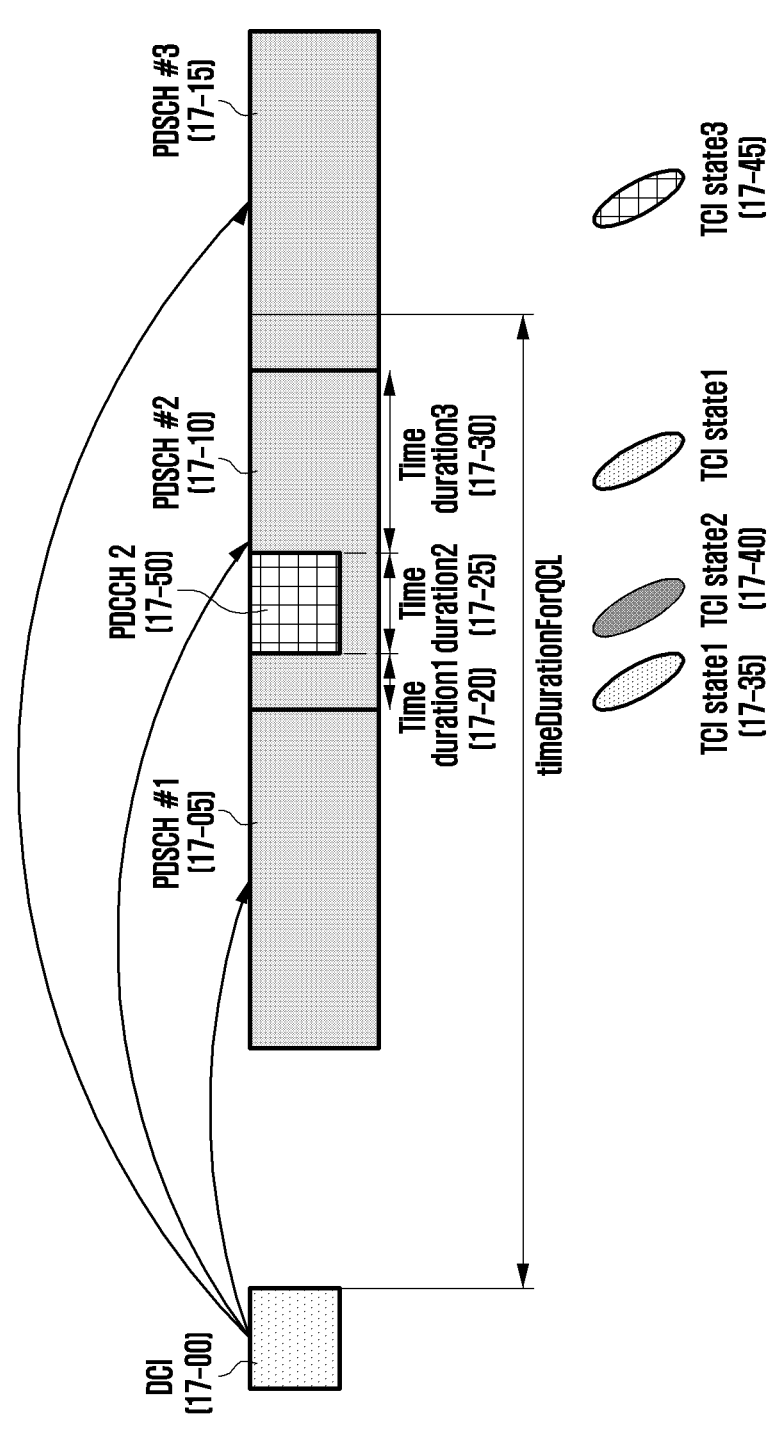
FIG. 17 illustrates transmission of multiple PDSCHs overlapping with a PDCCH other than a PDCCH including scheduling DCI according to an embodiment.

FIG. 17 illustrates transmission of multiple PDSCHs overlapping with a PDCCH other than a PDCCH including scheduling DCI according to an embodiment.

Referring to FIG. 17, a UE may receive a PDCCH including scheduling DCI 17-00, and may receive multiple scheduled PDSCHs 17-05, 17-10, and 17-15 overlapping with a PDCCH 17-50. For convenience of explanation below, the PDCCH 17-50 may be defined as PDCCH2. Here, the UE may receive the PDSCH #1 17-05 by using the default TCI state (default QCL/TCI) 17-35 described above. As the default TCI state (default QCL/TCI) 17-35, a TCI state (QCL/TCI) of a CORESET having the lowest CORE-SET ID included in the latest slot in which a CORESET is monitored by the UE may be used.

In addition, the UE may receive PDSCH #2 17-10 by using the above described default TCI state (default QCL/TCI) 17-35 in time duration 1 17-20. When the PDCCH and the PDSCH are received while overlapping in at least one symbol, the UE prioritizes the reception of a CORESET associated with the PDCCH, and thus the UE may receive PDCCH2 17-50 and PDSCH #2 17-10 by using TCI state (QCL/TCI) 17-40 of a CORESET associated with PDCCH2 during time duration 2 17-25. In addition, the UE may receive PDCCH2 17-50 and PDSCH #2 17-10 by using the above-described default TCI state (default QCL/TCI) 17-35 of CORESET associated with PDCCH2 during time duration 3 17-30. The UE may receive PDSCH #3 17-15 by using TCI state (QCL/TCI) 17-45 of a CORESET having the lowest CORESET ID in a slot including PDCCH2.

When the three TCI states (QCL/TCI) 17-35, 17-40, and 17-45 are the same, the UE may receive PDCCH2 and multiple PDSCHs based on one TCI state (QCL/TCI). When one of the three TCI states (QCL/TCI) is different or all of the three TCI states are different, and a beam switching time is not required, the UE may receive PDCCH2 17-50 and multiple PDSCHs based on different TCI states (QCL/TCI). If any one of the three TCI states (QCL/TCI) is different or all of the three TCI states are different, and a beam switching time is required, the UE may not provide the expected performance because it may not provide a beam switching time required at the time of transition from time duration 1 17-20 to time duration 2 17-25, transition from time duration 2 17-25 to time duration 3 17-30, or transition from PDSCH #2 17-10 to PDSCH #3 17-15. Here, the following operation may be expected for default beam configuration for multiple PDSCHs. Time duration 1 17-20 and time duration 3 17-30 may have a value of 0 or more depending on the symbol position in which the PDCCH 2 17-50 is searched for.
Method 4-1: Method for Avoiding the Above Situation by Scheduling The base station may prevent the above situation from occurring through PDSCH scheduling. For example, the base station may schedule the PDSCH by adjusting the value of a slot offset (K0), the value of a symbol (S) within a slot, and the symbol length ($l_d$) of PDSCH, so as to allow a distance between the last symbol of the PDCCH2 and the first symbol of the first transmitted PDSCH among the multiple scheduled PDSCHs to be at least time duration X.

Alternatively, the base station may schedule the PDSCH so that a distance between the first symbol of the PDCCH2 and the last symbol of the last transmitted PDSCH among the multiple scheduled PDSCHs is to be at least time duration X.

Specific details of the time duration X are the same as described above, and will be omitted below.
Method 4-2: Method in which Both a PDCCH and a PDSCH Use the Same TCI State (QCL/TCI)

In case that multiple PDSCHs are scheduled in the above situation,

In case that a search region in which a CORESET associated with PDCCH2 is searched for is a common search region, the UE may receive multiple PDSCH DM-RSs by using the same TCI state (QCL/TCI) as the TCI state (QCL/TCI) of a CORESET associated with PDCCH2.

In case that a search region in which a CORESET associated with PDCCH2 is searched for is a UE-specific search region, the UE may receive the same TCI state (QCL/TCI) as the TC state (QCL/TCI) of a CORESET associated with PDCCH2 by using multiple PDSCH DM-RSs.

Alternatively, if the default TCI state (default QCL/TCI) of the multiple PDSCHs is the same as the default TCI state (default QCL/TCI) of PDSCH #1 transmitted first among the multiple PDSCHs, the base station provides an indication of TCI state (QCL/TCI) of a CORESET associated with PDCCH2 to the UE by MAC CE signaling, and the UE may receive PDSCH 2 by using the same TCI state (QCL/TCI) as the TCI state (QCL/TCI) of the first transmitted PDSCH #1 DM-RS among the multiple PDSCHs.
Method 4-3: Method of Providing a Predetermined Symbol Spacing Between PDCCH and PDSCH In case that multiple PDSCHs are scheduled in the above situation, the base station may perform a rate matching operation and a puncturing operation for the remaining symbols except for time duration X symbol before the time when time duration 1 17-20 transitions to time duration 2 17-25 and time duration X symbol after the time when time duration 2 17-25 transitions to time duration 3 17-30. If TCI state (QCL/TCI) 17-45 used when receiving PDSCH #3 17-15 is different from QCL/TCL 17-35 of the PDSCH #2 17-10, the UE may perform a rate matching operation and a puncturing operation for the remaining symbols except for time duration X symbol before the last symbol of PDSCH #2 17-10 or at least time duration X symbol after the first symbol of PDSCH #3 17-15.

If the DM-RS of the PDSCH is included in a symbol corresponding to at least before time duration X from a symbol before the first symbol of PDCCH2, or the DM-RS of the PDSCH is included in a symbol corresponding to at least after time duration X from a symbol after the last symbol of PDCCH2 17-50, the DM-RS of the PDSCH may be moved to a symbol for which the subsequent PDSCH is scheduled and transmitted. For example, when the last symbol index of the PDCCH2 is "n", and a symbol corresponding to at least time duration X from a symbol after the symbol having index n is "n+X", the DM-RS may be located in a symbol having index of "n+X+a" (for example, a=1). The value of "a" may be changed based on the configuration or transmission situation of the base station, but the moved DM-RS may not be located after a slot boundary or after a symbol for which the PDSCH is scheduled.

Method 4-4: Method in which No PDCCH is Searched for

In case that multiple PDSCHs are scheduled in the above situation, the UE may not expect PDCCH search in symbols for which multiple PDSCHs have been scheduled. Here, restriction on the maximum number of PDCCH candidates to be monitored by the UE and restriction on the maximum number of CCEs may be changed, with regard to each slot or each span, according to UE capability report, as long as no search is needed. For example, UE capability report of r15monitoringcapability may be defined per slot, and UE capability report of r16monitoringcapability may be defined per span.

In case that a search region in which a CORESET associated with PDCCH2 is searched for is a common search region, and when PDCCH2 and multiple PDSCHs overlap in a time-frequency domain, the UE does not perform transmission to a resource region in which PDCCH2 and multiple PDSCHs overlap, and may perform rate matching or puncturing operations for a PDSCH resource region except for the overlapped resource region.

In case that a search region in which a CORESET associated with PDCCH2 is searched for is a UE-specific search region, and when PDCCH2 and multiple PDSCHs overlap in a time-frequency domain, the UE may perform transmission to a resource region, in which PDCCH2 and PDSCH overlap, regarding as multiple PDSCH resource regions.

Figure 18:
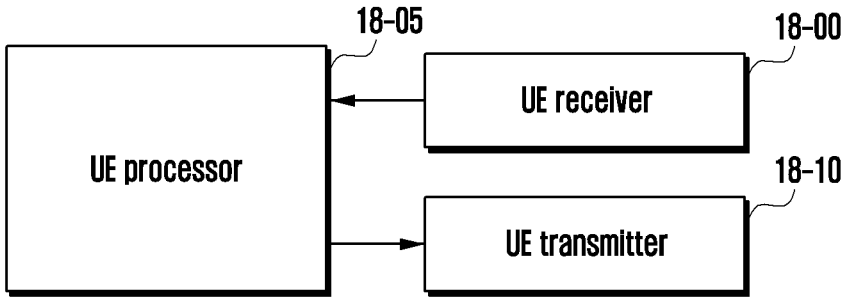
FIG. 18 illustrates a UE according to an embodiment.

FIG. 18 illustrates a UE according to an embodiment.

Referring to FIG. 18, the UE includes a UE receiver 18-00, a UE transmitter 18-10, and a UE processor (a controller) 18-05.

The UE receiver 18-00 and the UE transmitter 18-10 may be collectively called a transceiver. According to the communication method of the UE described above, the UE receiver 18-00, the UE transmitter 18-10, and the UE processor 18-05 of the UE may operate.

However, the elements of the UE are not limited to the above-described examples. For example, the UE may include more or fewer elements (e.g., a memory and the like) than the aforementioned elements.

In addition, the UE receiver 18-00, the UE transmitter 18-10, and the UE processor 18-05 may be implemented in the form of a single chip.

The UE receiver 18-00 and the UE transmitter 18-10 (or transceiver) may transmit or receive a signal to or from a base station. Here, the signal may include control information and data. To this end, the transceiver may include a radio frequency (RF) transmitter for up-converting and amplifying a frequency of a transmitted signal, an RF receiver for low-noise amplifying and down-converting a received signal, etc. However, this is only an exemplary embodiment of the transceiver, and the elements of the transceiver are not limited to the RF transmitter and the RF receiver.

In addition, the transceiver may receive a signal through a wireless channel and output the received signal to the UE processor 18-05, and may transmit a signal, which is output from the UE processor 18-05, through a wireless channel.

A memory may be included in the UE, which stores programs and data for the operation of the UE. In addition, the memory may store control information or data included in a signal acquired by the UE. The memory may be configured as a storage medium, such as read only memory (ROM), random access memory (RAM), a hard disk, a compact disc (CD)-ROM, a digital versatile disc (DVD), or a combination of storage media.

The UE processor 18-05 may control a series of processes so that the UE may operate according to the above-described embodiments. The UE processor 18-05 may be implemented as a controller or one or more processors.

Figure 19:
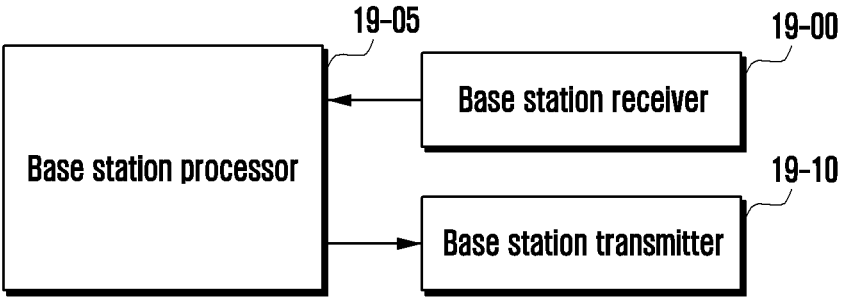
FIG. 19 illustrates a base station according to an embodiment.

FIG. 19 illustrates a base station according to an embodiment.

Referring to FIG. 19, the base station includes a base station receiver 19-00, a base station transmitter 19-10, and a base station processor (a controller) 19-05.

The base station receiver 19-00 and the base station transmitter 19-10 may be collectively called a transceiver. According to the communication method of the base station described above, the base station receiver 19-00, the base station transmitter 19-10, and the base station processor 19-05 of the base station may operate.

However, the elements of the base station are not limited to the above-described examples. For example, the base station may include more or fewer elements (e.g., a memory) than the aforementioned elements. In addition, the base station receiver 19-00, the base station transmitter 19-10, and the base station processor 19-05 may be implemented in the form of a single chip.

The base station receiver 19-00 and the base station transmitter 19-10 (or transceiver) may transmit or receive a signal to or from the UE. Here, the signal may include control information and data. To this end, the transceiver may include an RF transmitter for up-converting and amplifying a frequency of a transmitted signal, an RF receiver for low-noise amplifying and down-converting a received signal, etc. However, this is only an exemplary embodiment of the transceiver, and the elements of the transceiver are not limited to the RF transmitter and the RF receiver.

In addition, the transceiver may receive a signal through a wireless channel and output the received signal to the base station processor 19-05, and may transmit a signal, which is output from the base station processor 19-05, through a wireless channel.

A memory may be included, which stores programs and data for the operation of the base station. In addition, the memory may store control information or data included in a signal acquired by the base station. The memory may be configured as a storage medium, such as ROM, RAM, hard disk, CD-ROM, DVD, or a combination of storage media.

The base station processor 19-05 may control a series of processes so that the base station may operate according to the above-described embodiments. The base station processor 19-05 may be implemented as a controller or one or more processors.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Further, although not set forth in the disclosure, methods which use separate tables or information including at least one element contained in the tables proposed in the disclosure are also possible.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a user equipment (UE) in a communication system, the method comprising:

receiving, from a base station, a radio resource control (RRC) message including physical downlink shared channel (PDSCH) resource allocation information, transmission configuration indication (TCI) state information, and time duration information related to quasi co location (QCL);

receiving, from the base station, downlink control information (DCI) for scheduling multiple PDSCHs on a first physical downlink control channel (PDCCH);

configuring a first TCI state of PDSCHs within a time duration for QCL as a default TCI state based on a time offset between the first PDCCH and a first PDSCH of the multiple PDSCHs being less than the time duration for QCL;

receiving, from the base station, the multiple PDSCHs scheduled by the DCI;

determining whether to skip monitoring a second PDCCH overlapping with at least one PDSCH within the time duration;

in case that a second TCI state of the second PDCCH is same as the first TCI state, monitoring the second PDCCH; and in case that the second TCI state of the second PDCCH is different from the first TCI state and a beam switching time is considered for switching a beam between the at least one PDSCH and the second PDCCH, determining to skip monitoring the second PDCCH, wherein in case that the second PDCCH is associated with a common search space, rate matching or puncturing is performed on the at least one PDSCH overlapping the second PDCCH, and wherein in case that the second PDCCH is associated with a UE-specific search space, the at least one PDSCH overlapping the seco d s received.

2. The method of claim 1, wherein a maximum number of PDCCH candidates or a maximum number of control channel elements (CCEs) of the UE is changed based on at least one symbol overlapping with the at least one PDSCH, and wherein the maximum number of PDCCH candidates or the maximum number of CCEs is defined for each slot or each span based on a UE capability.

3. A method performed by a base station in a communication system, the method comprising:

transmitting, to a user equipment (UE), a radio resource control (RRC) message including physical downlink shared channel (PDSCH) resource allocation information, transmission configuration indication (TCI) state information, and time duration information related to quasi co location (QCL);

transmitting, to the UE, downlink control information (DCI) for scheduling multiple PDSCHs on a first physical downlink control channel (PDCCH); and transmitting, to the UE, the multiple PDSCHs scheduled by the DCI, wherein, based on a time offset between the first PDCCH and a first PDSCH of the multiple PDSCHs being less than a time duration for QCL, a first TCI state of PDSCHs within the time duration for QCL is set as a default TCI state, wherein in case that a second TCI state of a second PDCCH overlapping with at least one PDSCH within the time duration is same as the first TCI state, the second PDCCH is monitored, wherein in case that the second TCI state of the second PDCCH is different from the first TCI state and a beam switching time is considered for switching a beam between the at least one PDSCH and the second PDCCH, monitoring the second PDCCH is skipped, wherein in case that the second PDCCH is associated with a common search space, rate matching or puncturing is performed on the at least one PDSCH overlapping the second PDCCH, and wherein in case that the second PDCCH is associated with a UE-specific search space, the at least one PDSCH overlapping the second PDCCH is transmitted.

4. The method of claim 3, wherein a maximum number of PDCCH candidates or a maximum number of control channel elements (CCEs) of the UE is changed based on at least one symbol overlapping with the at least one PDSCH, and wherein the maximum number of PDCCH candidates or the maximum number of CCEs is defined for each slot or each span based on a UE capability.

5. A user equipment (UE) in a communication system, the UE comprising:

a transceiver; and a controller coupled with the transceiver and configured to:

receive, from a base station, a radio resource control (RRC) message including physical downlink shared channel (PDSCH) resource allocation information, transmission configuration indication (TCI) state information, and time duration information related to quasi co location (QCL), receive, from the base station, downlink control information (DCI) for scheduling multiple PDSCHs on a first physical downlink control channel (PDCCH), configure a first TCI state of PDSCHs within a time duration for QCL as a default TCI state based on a time offset between the first PDCCH and a first PDSCH of the multiple PDSCHs being less than the time duration for QCL, receive, from the base station, the multiple PDSCHs scheduled by the DCI, determine whether to skip monitoring a second PDCCH overlapping with at least one PDSCH within the time duration, in case that a second TCI state of the second PDCCH is same as the first TCI state, monitor the second PDCCH, and in case that the second TCI state of the second PDCCH is different from the first TCI state and a beam switching time is considered for switching a beam between the at least one PDSCH and the second PDCCH, determine to skip monitoring the second PDCCH, wherein in case that the second PDCCH is associated with a common search space, rate matching or puncturing is performed on the at least one PDSCH overlapping the second PDCCH, and wherein in case that the second PDCCH is associated with a UE-specific search space, the at least one PDSCH overlapping second PDCCH is received.

6. The UE of claim 5, wherein a maximum number of PDCCH candidates or a maximum number of control channel elements (CCEs) of the UE is changed based on at least one symbol overlapping with the at least one PDSCH, and wherein the maximum number of PDCCH candidates or the maximum number of CCEs is defined for each slot or each span based on a UE capability.

7. A base station in a communication system, the base station comprising:

a transceiver; and a controller coupled with the transceiver and configured to:

transmit, to a user equipment (UE), a radio resource control (RRC) message including physical downlink shared channel (PDSCH) resource allocation information, transmission configuration indication (TCI) state information, and time duration information related to quasi co location (QCL), transmit, to the UE, downlink control information (DCI) for scheduling multiple PDSCHs on a first physical downlink control channel (PDCCH), and transmit, to the UE, the multiple PDSCHs scheduled by the DCI, wherein, based on a time offset between the first PDCCH and a first PDSCH of the multiple PDSCHs being less than a time duration for QCL, a first TCI state of PDSCHs within the time duration for QCL is set as a default TCI state, wherein in case that a second ICI state of a second PDCCH overlapping with at least one PDSCH within the time duration is same as the first TCI state, the second PDCCH is monitored, wherein, in case that the second TCI state of the second PDCCH is different from the first TCI state and a beam switching time is considered for switching a beam between the at least one PDSCH and the second PDCCH, monitoring the second PDCCH is skipped, wherein in case that the second PDCCH is associated with a common search space, rate matching or puncturing is performed on the at least one PDSCH overlapping the second PDCCH, and wherein in case that the second PDCCH is associated with a UE-specific search space, the at least one PDSCH overlapping the second PDCCH is transmitted.

8. The base station of claim 7, wherein a maximum number of PDCCH candidates or a maximum number of control channel elements (CCEs) of the UE is changed based on at least one symbol overlapping with the at least one PDSCH, and wherein the maximum number of PDCCH candidates or the maximum number of CCEs is defined for each slot or each span based on a UE capability.

* * * * *